(12) United States Patent
Kim et al.

(10) Patent No.: US 9,674,930 B2
(45) Date of Patent: Jun. 6, 2017

(54) LIGHTING CONTROL APPARATUS, WIRELESS LIGHTING SYSTEM, AND METHOD OF CONTROLLING THE SAME

(71) Applicant: LG INNOTEK CO., LTD., Seoul (KR)

(72) Inventors: Dae Hun Kim, Seoul (KR); Ki Chul Chang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/671,011

(22) Filed: Mar. 27, 2015

(65) Prior Publication Data

US 2015/0282283 A1   Oct. 1, 2015

(30) Foreign Application Priority Data

Mar. 28, 2014   (KR) .................. 10-2014-0037198

(51) Int. Cl.
| | |
|---|---|
| H05B 37/02 | (2006.01) |
| H04W 4/00 | (2009.01) |
| H04B 5/00 | (2006.01) |
| G08C 17/02 | (2006.01) |

(52) U.S. Cl.
CPC ....... H05B 37/0272 (2013.01); H04B 5/0062 (2013.01); H04W 4/008 (2013.01)

(58) Field of Classification Search
CPC  H05B 37/0272; H05B 37/0227; H05B 37/02; H05B 37/0245; H05B 37/0254; H05B 37/029; H05B 39/088; Y02B 20/48; Y02B 20/44

USPC ....... 315/294, 312, 149, 363, 131, 151, 155, 315/287, 291, 292, 297, 34, 360; 340/10.5, 10.1, 10.42, 12.25, 12.5, 13.26, 340/539.1, 572.1, 6.1, 8.1, 9.1
See application file for complete search history.

(56) References Cited

U.S. PATENT DOCUMENTS

| | | | |
|---|---|---|---|
| 8,339,247 B2 | 12/2012 | Adamson et al. | |
| 2010/0052866 A1 | 3/2010 | Elferich et al. | |
| 2011/0160881 A1* | 6/2011 | Grey | G06Q 10/06 700/90 |
| 2011/0169606 A1* | 7/2011 | Brandsma | G05B 15/02 340/9.1 |
| 2014/0167929 A1* | 6/2014 | Shim | G08C 17/02 340/12.5 |

FOREIGN PATENT DOCUMENTS

| | | | |
|---|---|---|---|
| JP | 2011-175757 A | 9/2011 | |
| WO | WO2010079388 A1 * | 7/2010 | H05B 37/02 |

* cited by examiner

*Primary Examiner* — Alexander H Taningco
*Assistant Examiner* — Renan Luque
(74) *Attorney, Agent, or Firm* — KED & Associates, LLP

(57) ABSTRACT

A lighting control apparatus includes a wireless communication module to receive tag information transmitted from a light switch, a control module to register the received tag information by matching the received tag information with at least one of a plurality of lighting devices, and to control the lighting devices using the registered tag information, and a storage module to store the tag information and identification information of the lighting device matched with the tag information.

16 Claims, 21 Drawing Sheets

LIGHTING CONTROL APPARATUS, WIRELESS LIGHTING SYSTEM, AND METHOD OF CONTROLLING THE SAME

CROSS-REFERENCE TO RELATED APPLICATION

This application claims priority under 35 U.S.C. §119 to Korean Application No. 10-2014-0037198 filed on Mar. 28, 2014, whose entire disclosure is incorporated herein by reference.

BACKGROUND

1. Field

The disclosure relates to a lighting control apparatus, a lighting control system and a method of controlling the same.

2. Background

A user manually operates a switch connected with a lighting device through a cable in order to turn on or turn off the lighting device. Patients, the senior citizen or the infirm who cannot move freely, or children who cannot reach the switch may feel inconvenience when turning on or off the lighting device. In order to overcome the inconvenience, a lighting device turned on or turned off using a remote control device, such as a remote controller is launched. In this case, the lighting intensity of the lighting device can be adjusted by the remote control device by providing a wireless communication module in the lighting device.

The remote control device generates a lighting control signal according to the operation of a user, and transmits the lighting control signal to the wireless communication module provided in the lighting device. The lighting device controls lighting based on the lighting control signal received through the wireless communication module. Meanwhile, for the remote control of the lighting device, a plurality of lighting devices must be registered in a network.

In order to register the lighting devices in the network, identifiers (for example, 1, 2, 3, and 4) are previously assigned to the lighting devices according to positions of the lighting devices as shown in drawings. The identifiers of the lighting devices are individually searched and input in the lighting devices for the registration of the network. However, many procedures are necessary in order to register all lighting devices in the network as described above, the input errors of the identifiers into the lighting devices frequently occur, and the repair of the lighting devices is not easy.

Although the lighting devices are registered in the network, the operation of a specific lighting device among the lighting devices may be slightly difficult. In other words, a user must select one specific lighting device among the lighting devices. As the number of the lighting devices is increased, the time to select one of the lighting devices is increasingly required. In other words, an additional remote control device is used to control the lighting device installed at a specific position among a plurality of lighting devices which are previously installed. A control application is executed, and a specific control device is inconveniently found on a screen where the control application is executed.

BRIEF DESCRIPTION OF THE DRAWINGS

The embodiments will be described in detail with reference to the following drawings in which like reference numerals refer to like elements wherein.

DETAILED DESCRIPTION

Figure 1:
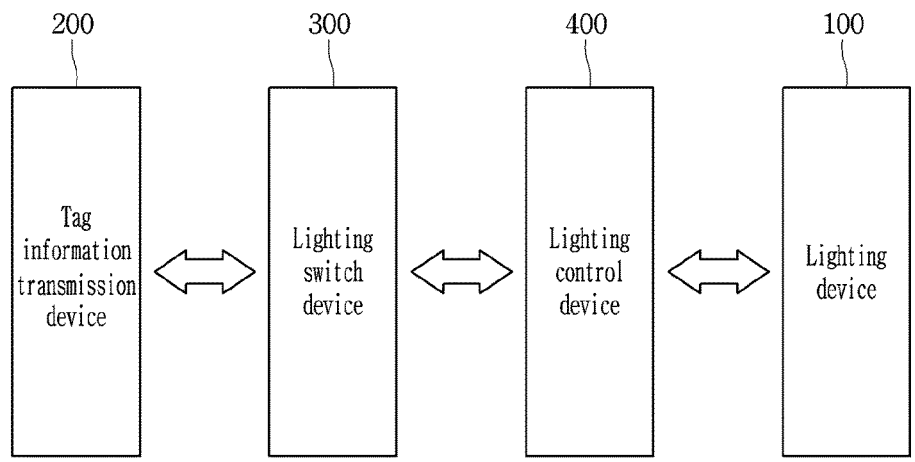
FIG. 1 is a block diagram schematically showing a wireless lighting system according to the embodiment of the disclosure.

FIG. 1 is a block diagram schematically showing a wireless lighting system according to the embodiment of the disclosure. The wireless lighting system includes a lighting device 100, a tag information transmission device 200, a lighting switch device 300, and a lighting control device 400.

At least one lighting device 100 is installed in each interior space that is previously allocated to the lighting device 100. For example, the lighting device 100 may include central lighting, cove lighting, down light, and a stand lamp. The lighting device 100 may be installed in an interior space of a building such as a company. Accordingly, the lighting device 100 may include a first lighting device provided on a ceiling in a work place of a first user and a second lighting device provided on a ceiling in a work place of a second user. Although the lighting device 100 includes the first and second lighting devices, the number of the lighting device 100 may be more increased.

The lighting device 100 includes a lighting unit 110 and a communication module 120. The communication module 120 receives a lighting control signal transmitted from an outside. The lighting unit 100 includes at least one light and controls the operation of the al least one light based on the received lighting control signal. The operation control of the light may include power control (e.g., power on or off), brightness control, and color temperature control of the light.

The tag information transmission device 200 receives tag information. The tag information transmission device 200 may store the tag information therein, and transmit the stored tag information to the lighting switch device 300. The tag information transmission device 200 may include various devices sufficient to store and transmit the tag information as described above. The tag information transmission device 200 may include a near-field communication (NFC) tag to store and transmit tag information corresponding to a user. In addition, the tag information transmission device 200 may include a terminal to store and transmit the tag information.

The terminal may include a cellular phone, a smart phone, a laptop computer, a digital broadcasting terminal, a personal digital assistant (PDA), a portable multimedia player (PMP), and a navigation. However, those skilled in the art can easily understand that the configuration according to the embodiment disclosed in the disclosure can be applied to a stationary terminal, such as a digital television, or a desk-top computer, other than a case that the configuration can be applied only to a mobile terminal.

As the tag information transmission device 200 approaches the lighting switch device 300, the lighting switch device 300 receives the tag information stored in the tag information transmission device 200 and transmits the received tag information to the lighting control device 400.

The lighting switch device 300 may output operating state information of a lighting device matched with the tag information and registered. In this case, the operating state information may include information about notification of an on/off state of the lighting device. The tag information may be transmitted from the lighting switch device 300 to the lighting control device 400 for the purpose of registering the tag information. Alternatively, the tag information may be transmitted to control the operation of a specific lighting device matched with the tag information.

When the tag information transmission device 200 to transmit the tag information is a terminal, the lighting switch device 300 receives lighting setting information transmitted from the tag information transmission device 200 as well as the tag information, and transmits the tag information and the tag setting information to the lighting control device 400.

The lighting setting information may include lighting brightness information, color temperature information, on/off schedule information, and cooperating lighting device information set by a lighting control application executed in the terminal.

The lighting control device 400 may perform a tag information registration operation and a control operation of the lighting device based on the tag information.

The tag information registration operation refers to a series of operations to match specific tag information with a specific lighting device. The tag information registration operation refers to an operation to match the tag information with at least one of multiple lighting devices 100.

If tag information registration is completed, the lighting control device 400 controls each of the multiple lighting devices 100 using the registered tag information.

In other words, the lighting control device 400 receives the tag information transmitted from the lighting switch device 300. In addition, the lighting control device 400 determines if the tag information transmitted from the lighting switch device 300 is previously registered.

If the tag information is previously registered, the lighting control device 400 determines a lighting device 100 matched with the tag information. In addition, the lighting control device 400 transmits a control signal to control the operation of the lighting device 100. The lighting control device 400 determines if there is lighting setting information previously stored corresponding to the determined lighting device 100. In addition, the lighting control device 400 controls the lighting device 100 using the lighting setting information if the lighting setting information is previously stored.

The lighting control device 400 outputs the control signal based on a present operating state of the determined lighting device 100. For example, if the present operating state of the determined lighting device 100 is an on status, the lighting control device 400 outputs a control signal, which is used to change the operating state of the lighting device 100 into an off status, to the lighting device 100. On the contrary, if the present operating state of the determined lighting device 100 is the off status, the lighting control device 400 outputs a control signal, which is used to change the operating state of the lighting device 100, into the on status.

Generally, the lighting switch device 300 may be installed at the entrance of a building. In addition, users allow ID cards (which may be called a tag information transmission device) given to the users, respectively, to approach the lighting switch device 300, so that the users can come into a building or go out of the building. A company provides access cards to staffs for general office environment security, and the staffs allows the access cards to approach a reader installed at the entrance of an office to access the office.

If the tag information is received in the state that the lighting device 100 is turned on, a user having the tag information may be out of the building. If the tag information is received in the state that the lighting device 100 is turned off, the user having the tag information may be placed in the building.

Accordingly, if the tag information is received, the lighting control device 400 determines a lighting device matched with the received tag information and a present operating state of the lighting device, and controls operating state information of the determined lighting device.

In addition, the lighting control device 400 determines if previously set lighting setting information exits when controlling the operating state of the lighting device (changing the state of the lighting device into the on status). If the previously set lighting setting information exists, the lighting control device 400 not only can change the operating state of the lighting device into the on status, but also can adjust the brightness or the color temperature of the lighting device based on the lighting setting information.

Meanwhile, if tag information to be registered is received, the lighting control device 400 performs a registration operation of the tag information, and transmits result information from the registration operation to the lighting switch device 300. In this case, the lighting switch device 300 generates a notification signal to notify the receiving of the result information if the result information is received.

In addition, if tag information for the control of the operation of the lighting device is received, the lighting control device 400 determines the lighting device matched with the tag information and the present operating state information of the lighting device, and transmits the present operating state information to the lighting switch device 300.

Next, the lighting switch device 300 outputs the present operating state information of the lighting device corresponding to the tag information. In other words, when a user attempts a tagging operation in order to go out of the building, the lighting device corresponding to the tag information resulting from the tagging operation must be changed into the off status. However, if the lighting device has been previously in the off status, the lighting switch device 300 changes the state of the lighting device from the off state to the on state even in the state that the user leaves the place of the user.

Accordingly, the lighting switch device 300 outputs the present operating state information of the lighting device corresponding to the related tag information when the tagging operation has been performed as described above. In addition, the user may determine the present operating state information of the lighting device installed at the place where the user works, and performs a tagging operation again based on the present operating state information.

Hereinafter, the lighting switch device 300 will be described in more detail.

Figure 2:
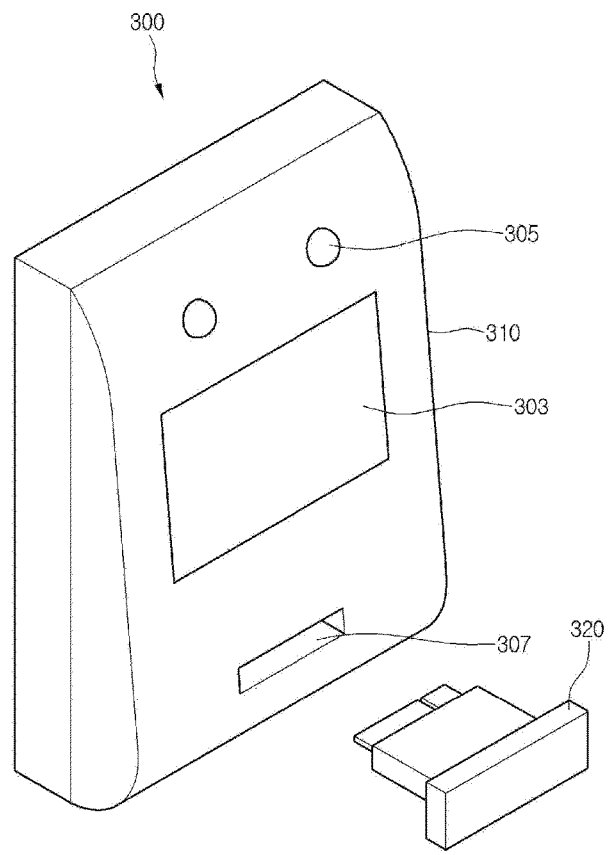
FIGS. 2 and 3 are views showing an outer appearance of a lighting switching device according to one embodiment of the disclosure.
Figure 3:
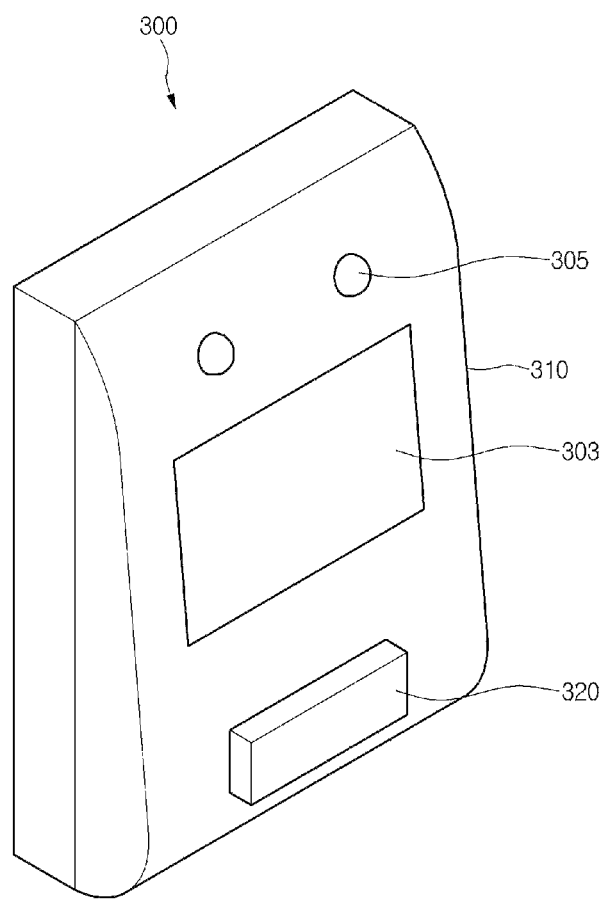
Figure 4:
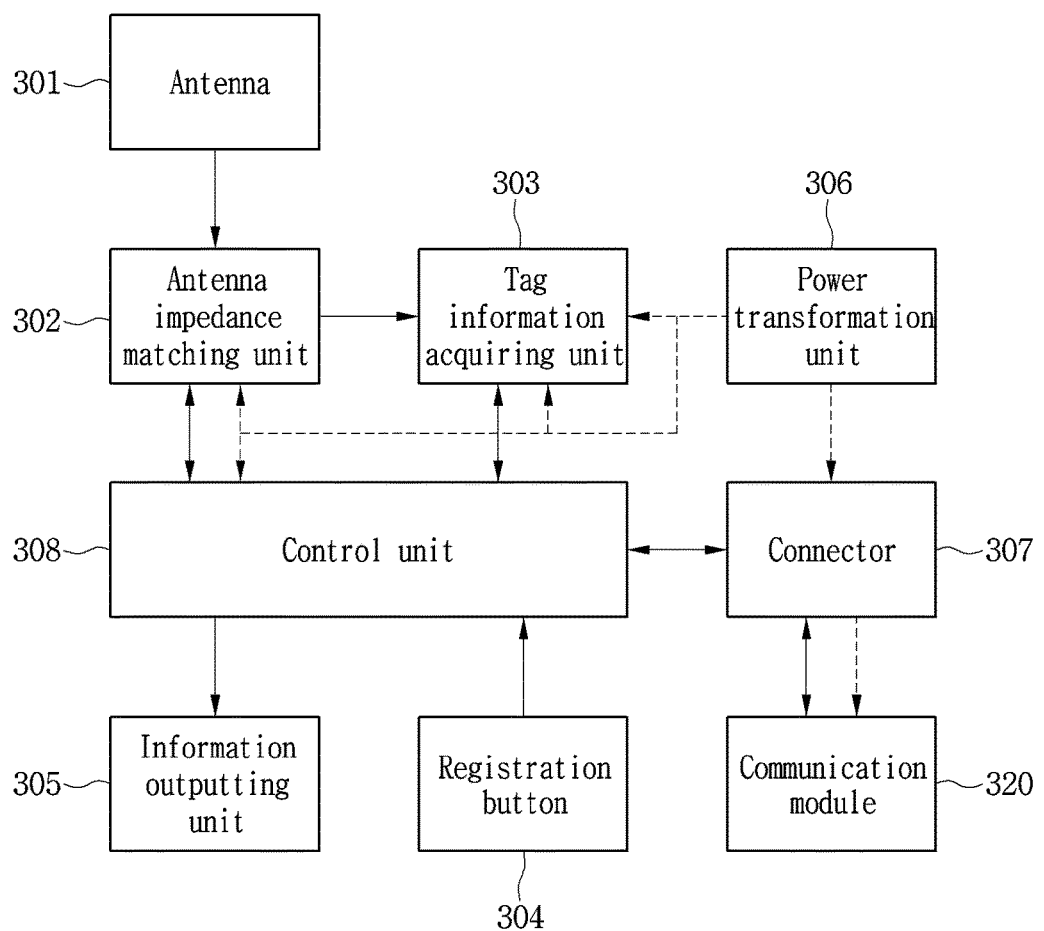
FIG. 4 is a view showing an internal structure of the lighting switching device according to one embodiment of the disclosure.

FIGS. 2 and 3 are views showing an outer appearance of a lighting switching device according to one embodiment of the disclosure. FIG. 4 is a view showing an internal structure of the lighting switching device according to one embodiment of the disclosure.

Referring to FIGS. 2 and 3, the lighting switch device 300 includes a reader unit 310 and a communication module 320.

The reader unit 310 constitutes a body of the lighting switch device 300. Accordingly, the reader unit 310 acquires tag information from the tag information transmission device 200 approaching a peripheral portion of the body of the lighting switch device 300.

The reader unit 310 is provided at a front surface thereof with a tag information acquiring unit 303 (reader) to acquire the tag information.

In addition, the reader unit 310 is provided at the front surface thereof with an information outputting unit 305 to output additional information corresponding to the acquired tag information. In this case, although the drawings show that the information outputting unit 305 includes a light emitting device for the illustrative purpose of one embodiment, the information outputting unit may include a display or a speaker.

In addition, the reader unit 310 is provided at the front surface thereof with a connector 307. The connector 307 is connected with the tag information acquiring unit 303. In addition, the connector 307 may include a groove formed in the reader unit 310.

The communication module 320 is inserted into the connector 307 of the reader unit 310. In other words, the communication module 320 is detachably provided from the connector 307 of the reader unit 310.

The communication module 320 is fixedly inserted into the connector 307 of the reader unit 310 to transmit the tag information acquired through the reader unit 310 to the lighting control device 400.

Referring to FIG. 4, the lighting switch device 300 includes an antenna 301, an antenna impedance matching unit 302, the tag information acquiring unit 303, a registration button 304, the information outputting unit 305, a power transformation unit 306, the connector 307, a control unit 308, and the communication module 320.

In other words, the reader unit 310 of the lighting switch device 300 may include the antenna 301, the antenna impedance matching unit 302, the tag information acquiring unit 303, the registration button 304, the information outputting unit 305, the power transformation unit 306, the connector 307, and the control unit 308.

The antenna 301 may be received in the body of the reader unit 310, and may be a pattern formed on a substrate. The antenna pattern may have a planar inverted F antenna (PIFA), but the embodiment is not limited thereto. In addition, the antenna pattern may be realized in a monopole antenna shape or a dipole antenna shape.

The antennal impedance matching unit 302 matches antenna impedance.

The tag information acquiring unit 303 is a reader and acquires tag information transmitted from the tag information transmission device 200.

The registration button 304 may be provided at an outer portion of a body of the reader unit 310. The registration button 304 is used for the registration of the tag information. For example, if the tag information is received in the state that the registration button 304 is pressed, the tag information is recognized as being registered after the tag information has been matched with a specific lighting device. If the tag information is received in the state that the registration button 304 is not pressed, the tag information is recognized as being used for the operation control of the specific lighting device matched with the tag information.

The information outputting unit 305 may output information of a registration result of the tag information. In addition, the information outputting unit 305 may output the present operating state information of the lighting device matched with the recognized tag information.

In addition, the information outputting unit 305 may output information to notify the non-registration of the tag information as the unregistered tag information is received.

The information outputting unit 305 may include only a light emitting unit to emit lights having mutually different colors. Alternatively, the information outputting unit 305 may be realized using a display or a speaker.

The power transformation unit 306 receives power from an outside and transforms the power to supply driving power to components constituting the lighting switch device 300.

In this case, the power transformation unit 306 is connected with the connector 307 to supply driving power to the communication module 320 inserted into the connector 307 through the connector 307.

The connector 307 is an interface unit, and makes data communication with the communication module 320 as the communication module 320 is inserted into the connector 307.

The connector 307 may transmit the tag information to the communication module 320. Alternatively, the connector 307 may receive other additional information (information of a registration result or the present operating state information of the lighting device) provided from the communication module 320.

The controller 308 converts the tag information acquired through the tag information acquiring unit 303 into a digital signal, and thus transmits the tag information converted into the digital signal to the communication module 320.

In addition, the controller 308 determines the input of the registration button 304 when transmitting the tag information, and transmits information to notify whether the tag information is used for registration or the control of the lighting device according to the input state of the registration button 304, together with the tag information.

In addition, the controller 308 determines the received additional information if the additional information is received through the communication module 320, and outputs the determined additional information through the information outputting unit 305.

If the additional information is input as well as the tag information for the registration of the tag information, the controller 308 provides the additional information to the communication module 320 together with the tag information.

In this case, the additional information may include MAC address information of the communication module installed in the lighting device.

The additional information is provided when the tag information is matched with the lighting device using the communication module installed in the lighting device. The details thereof will be described in more detail.

The communication module 320 is selectively inserted into the connector 307. The tag information delivered through the connector 307 is transmitted to the lighting control device 400. In addition, the communication module 320 receives additional information transmitted through the lighting control device 400 and outputs the additional information to the connector 307.

The operation of the lighting switch device 300 will be described in more detail below.

Hereinafter, the communication module 320 will be described.

Although the communication module 320 is installed in the lighting switch device 300, the communication module 320 is the same as that provided in the lighting device 100. Accordingly, the communication module 320 installed in the lighting switch device 300 will be described together with the communication module provided in the lighting device 100.

Hereinafter, the communication module installed in the lighting switch device 300 and the communication module installed in the lighting device 100 will be collectively called a communication module 500.

Figure 5:
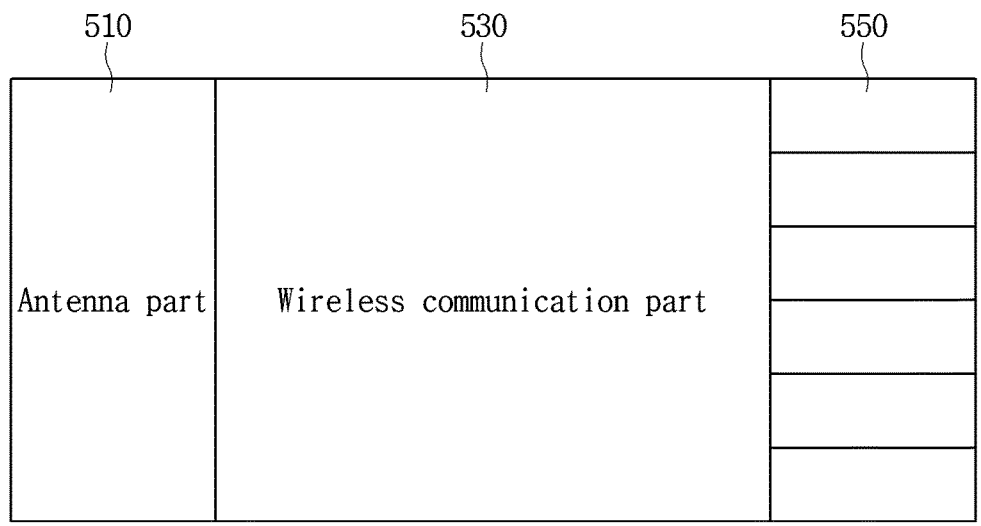
FIG. 5 is a view showing the structure of a communication module according to one embodiment of the disclosure.
Figure 6:
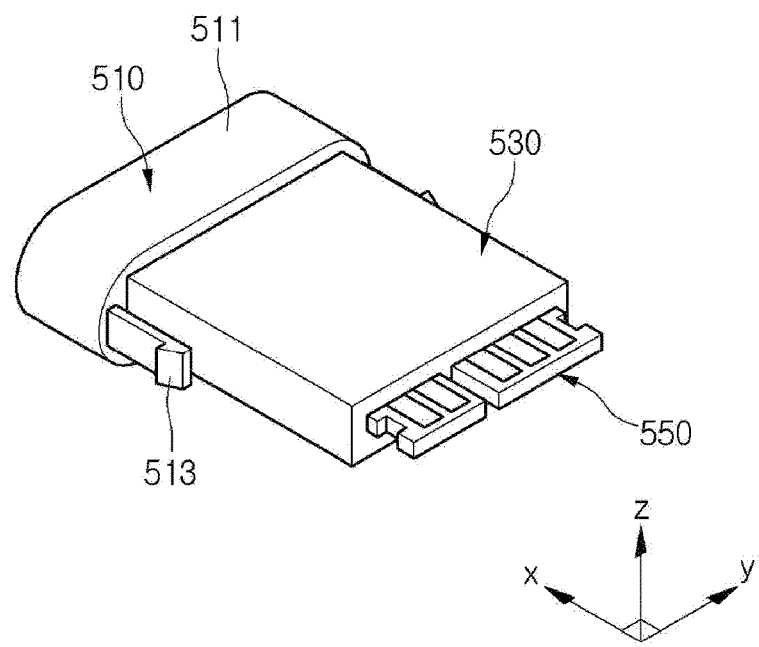
FIG. 6 is a perspective view showing the communication module of FIG. 5.
Figure 7:
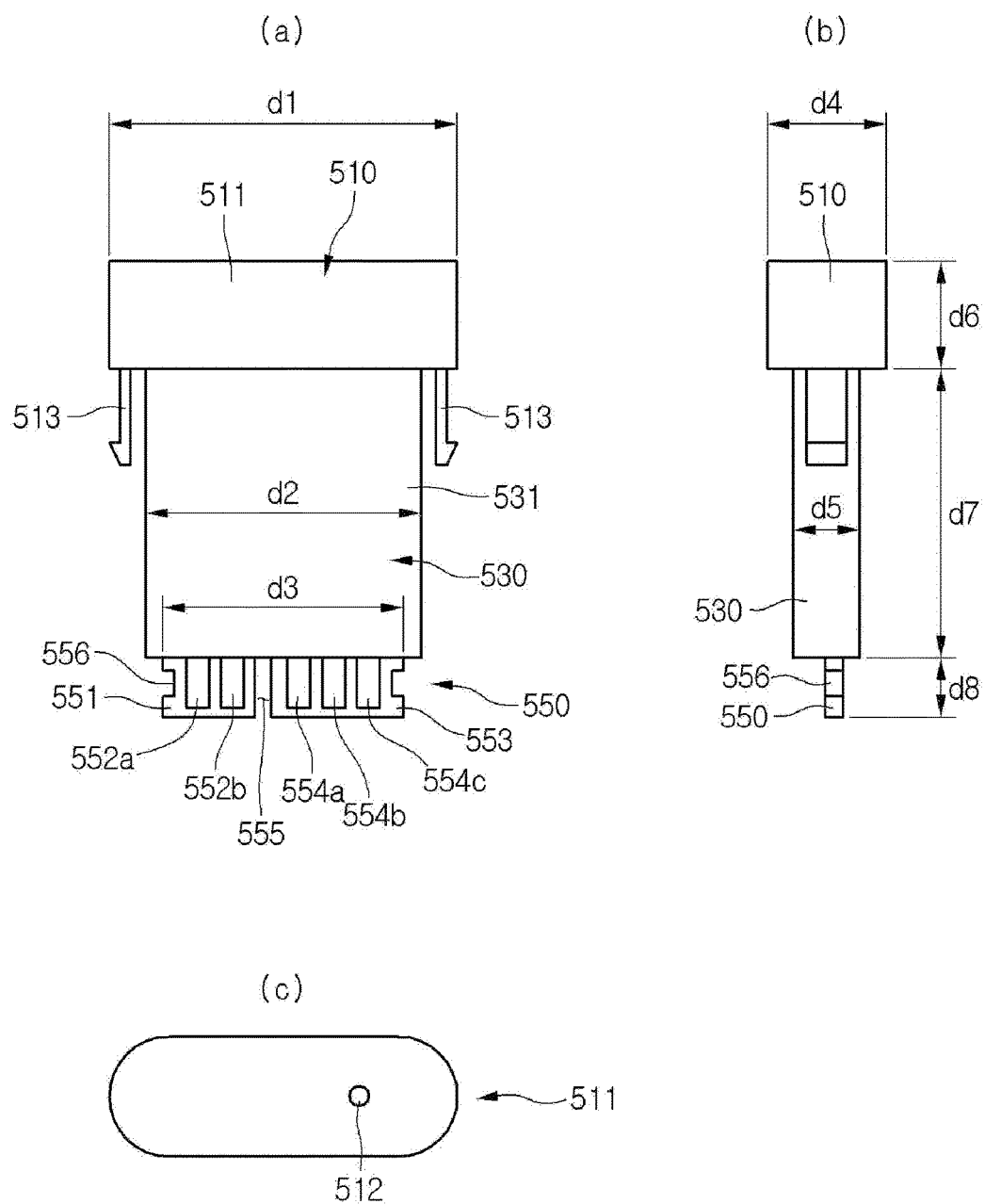
FIG. 7 shows top views of the communication module of FIG. 6, a side view of the communication module of FIG. 6 when viewed from a Y axis, and a side view of the communication module of FIG. 6 when viewed from an X axis, respectively.
Figure 8:
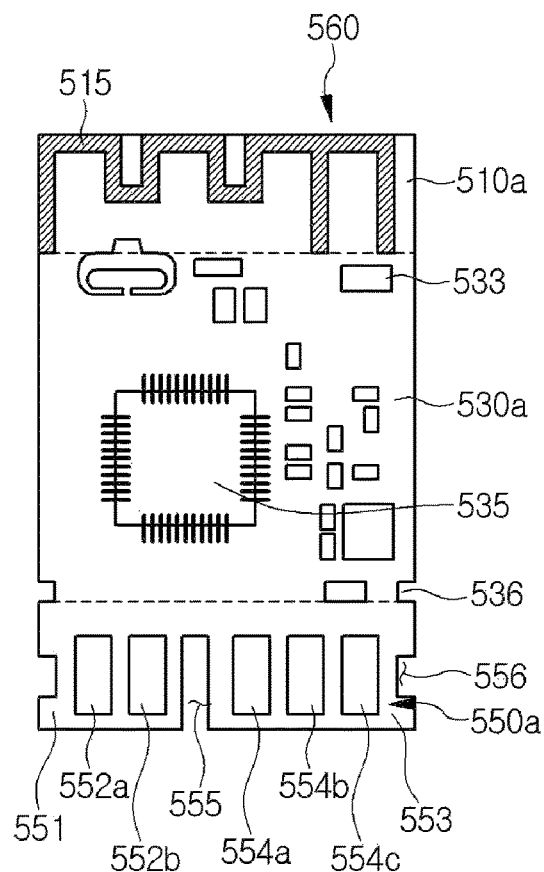
FIG. 8 is a top view showing a printed circuit board provided in the communication module of FIG. 6.
Figure 9:
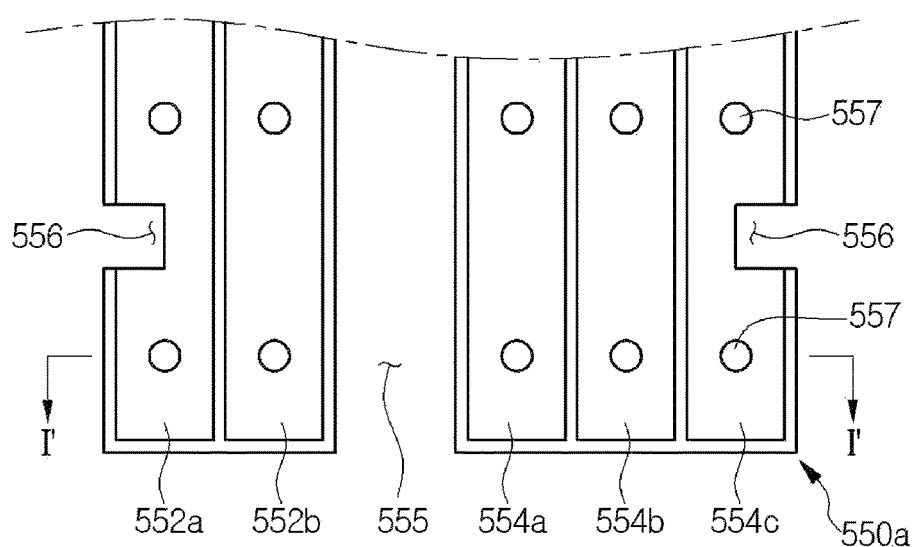
FIG. 9 is an enlarged view showing an interface unit of the printed circuit board.

FIG. 5 is a view showing the structure of the communication module according to one embodiment of the disclosure. FIG. 6 is a perspective view showing a communication module of FIG. 5, and FIG. 7 shows top views of the communication module of FIG. 6, a side view of the communication module of FIG. 6 when viewed from a Y axis, and a side view of the communication module of FIG. 6 when viewed from an X axis, respectively. FIG. 8 is a top view showing a printed circuit board provided in the communication module of FIG. 6, and FIG. 9 is an enlarged view showing an interface unit of the printed circuit board.

The communication module 500 includes housings 511 and 531 integrated with each other, and an antenna part 510, a wireless communication part 530, and an interface part 550 are formed in the housings 511 and 531 while being united in the form of one unit.

The antenna part 510 receives a signal transmitted through the lighting control device 400 or transmits the tag information or other additional information to the lighting control device 400.

The wireless communication part 530 transmits the tag information or other additional information to the antenna part 510 or generates an output signal to be transmitted through the antenna part 510.

The wireless communication part 530 includes a communication integrated circuit 535 to analyze the control signal of the antenna part 510 according to the type of a wireless network.

In other words, the communication module 500 may select the communication integrated circuit 535 according to determined wireless network environments and install the communication integrated circuit 535 in the communication module 500.

The communication integrated circuit 535 may support at least one of communication schemes including ZigBee, Z-wave, Wi-Fi, and Bluetooth.

The interface part 550 includes a plurality of pins 552a, 552b, 554a, 554b, and 554c corresponding to a plurality of output signals output from the wireless communication part 530.

Five pins 552a, 552b, 554a, 554b, and 554c may be provided. Alternatively, as shown in FIG. 5, six pins may be provided, but the embodiment is not limited thereto.

The communication module 500 according to the embodiment includes a printed circuit board where the antenna part 510, the wireless communication part 530, and the interface part 550 are integrated with each other and the housings 511 and 531 to receive a portion of the printed circuit board.

The housings 511 and 531 receives the printed circuit board while protruding a region corresponding to the interface part 550 out thereof.

The housings 511 and 531 include a first receiving part 511 to receive the antenna part 510 and a second receiving part 531 protruding from the first receiving part 511 in a first direction (x), and receiving the wireless communication part 530.

The first and second receiving parts 511 and 531 may be formed in one body. In addition, the first and second receiving parts 511 and 531 may be an assembly of an upper body and a lower body coupled to each other in a second direction (z) perpendicular to the first direction (x).

The housings 511 and 531 may be formed of an insulating material. Preferably, the housings 511 and 531 may be formed of a rigid type of plastic material such as polyimide.

The first receiving part 511 has an internal space to receive the antenna part 510 of the printed circuit board, and has an elongated shape extending in a third direction (y).

In the first receiving part 511, a first width d1 in the third direction (y) may be in the range of 20 mm to 25 mm, and preferably may be 22 mm. In addition, the first receiving part 511 has a first directional (x) width d6 in the range of 6 mm to 7 mm, and preferably the range of 6.4 mm to 6.5 mm. In addition, a second directional (z) height d4 of the first receiving part 511 may be in the range of 7 mm to 8 mm, and preferably may be 7.7 mm.

A side of the first receiving part 511 is tapered to have a predetermined curvature.

The printed circuit board inserted into the space of the first receiving part 511 includes an antenna region 510a corresponding to the antenna part 510.

The antenna region 510a is formed at one end of the printed circuit board, and includes an antenna pattern 515 patterned on a support substrate (not shown).

The antenna pattern 515 may have a planar inverted F antenna (PIFA), but the embodiment is not limited thereto.

In other words, the antenna pattern 515 may be realized in a monopole antenna shape or a dipole antenna shape.

The antenna part 510 is provided to transceive a signal having a predetermined frequency band. The antenna pattern 515 makes resonance at a predetermined frequency band to pass a signal. The antenna pattern 515 makes resonance at preset reference impedance.

The antenna pattern 515 is adjacent to a ground layer and has one end in which a feeding point is positioned. In this case, the feeding point may extend to a bottom surface of a substrate serving as a dielectric body after passing through the substrate. In this case, the antenna pattern 515 may include at least one horizontal component circuit bent by a bending part and a vertical component circuit.

For example, the antenna may include at least one of a meander type transmission circuit, a spiral type transmission circuit, a step type transmission circuit, and a loop type transmission circuit.

The ground layer is provided to ground the antenna pattern 515.

An internal or external matching pattern is provided to match the impedance of the antenna pattern 515 with reference impedance.

As the antenna part 510 includes a planar type antenna as described above, the antenna part 510 may be integrated with a small-size communication module 500.

The antenna pattern 515 may include a conductive material, or a material including metal, such as copper (Cu), aluminum (Al), nickel (Ni), or molybdenum (Mo).

Meanwhile, in the second receiving part 531 protruding in the first direction (x) from the first receiving part 511, a width d2 formed in the third direction (y) may be in the range of 17 mm to 18 mm, and may be preferably in the range of 17.4 mm to 17.5 mm. The width d7 formed in the first direction (x) may be in the range of 18 mm to 19 mm, and may be preferably in the range of 18 mm to 18.2 mm. The height d5 formed in the second direction (z) of the second receiving part 431 may be in the range of 4.5 mm to 5.2 mm, and preferably 5 mm.

Since the second receiving part 531 has the width d2 narrower than that of the first receiving part 511 in the third direction (y), predetermined dummy spaces are formed at side surfaces of the first receiving part 511. In addition, since the second receiving part 531 has the height d5 lower than that of the first receiving part 511, the second receiving part 531 may have the step difference from the first receiving part 511.

The second receiving part 531 is provided in a column form having an internal space to receive the wireless communication part 530 of the printed circuit board. The second receiving part 531 may have a rectangular parallelepiped shape.

A fixing part 513 is formed in a space formed at a lateral side of the first receiving part 511.

The fixing part 513 is formed in a dummy space formed due to the difference in an area between the first and second receiving parts 511 and 531 and protrudes in the first direction (x) from the lateral side of the first receiving part 511.

The fixing part 513 is integrated with the body of the housings 511 and 531 and provided at one end thereof with a triangular protrusion. Accordingly, the fixing part 513 is locked with the lighting device 100 or the lighting switch device 300 when coupling with the lighting device 100 or the lighting switch device 300, so that the fixing strength can be improved.

Fixing parts 513 may be formed at both lateral sides of the second receiving part 531. The fixing parts 513 may be formed in opposition to each other so that triangular protrusions are directed to the outside.

A module region 530a of the printed circuit board corresponding to the wireless communication part 530 inserted into the space of the second receiving part 531 has a plurality of components mounted therein.

The module region 530a is provided therein with an integrated circuit 535 to transceive data, and the wireless communication integrated circuit 535 may select one among ZigBee, Z-wave, Wi-Fi, and Bluetooth depending on wireless environments. In this case, the configuration of peripheral passive components and peripheral circuits may be varied depending on the type of the wireless communication integrated circuit 535.

A connection pattern 533 may be formed at the boundary between the module region 550a and the antenna region 510a for the connection with an external antenna.

A recess part 536 is formed at the boundary between the module region 530a and a terminal region 550a to fix the housings 511 and 531 and the printed circuit board. The recess part 536 may be coupled to a protrusion formed on an inner surface of the housings 511 and 531.

The terminal region 550a of the printed circuit board corresponding to the interface part 550 protruding from an end portion of the second receiving part 531 of the housings 511 and 531 includes a plurality of pins 552a, 552b, 554a, 554b, and 554c.

The terminal region 550a may have a length d8 in the range of 3.5 mm to 4.0 mm in the first direction (x) from the end portion of the housings 511 and 531, and may have a width d3 of 15 mm in the third direction (y).

The terminal region 550a includes a plurality of pins 552a, 552b, 554a, 554b, and 554c on the support substrate, and the pins 552a, 552b, 554a, 554b, and 554c may include five pins 552a, 552b, 554a, 554b, and 554c as shown in drawings, but the embodiment is not limited thereto.

When the pins 552a, 552b, 554a, 554b, and 554c are formed, the pins 552a, 552b, 554a, 554b, and 554c are grouped in predetermined number. The terminal region 550a includes a recess part 555 formed by removing the support substrate among the pins 552a, 552b, 554a, 554b, and 554c.

The grouped pins 552a and 552b formed at the left side of the recess part 555 are defined by a first pin part 551, and the grouped pins 554a, 554b, and 554c formed at the right side of the recess part 555 is defined by a second pin part 553.

The first and second pin parts 551 and 553 include the pins 552a, 552b, 554a, 554b, and 554c in mutually different numbers.

On the assumption that the terminal region 550a includes five pins 552a, 552b, 554a, 554b, and 554c, the first pin part 551 may include two pins 552a and 552b, and the second pin part 553 may include three pins 554a, 554b, and 554c.

As described above, the pins 552a, 552b, 554a, 554b, and 554c are grouped in mutually different numbers, so that the front surface of the communication module 500 can be distinguished from the rear surface of the communication module 500.

The recess part 555 is formed between the first and second pin parts 551 and 553 to reduce interference among the pins 552a, 552b, 554a, 554b, and 554c of the first and second pin parts 551 and 553.

The recess part 555 may have the width of 0.9 mm or more, and the interval among the pins 552a, 552b, 554a, 554b, and 554c, and the pins 552a, 552b, 554a, 554b, and 554c may be set to 0.8 mm or less. However, the embodiment is not limited thereto.

A protrusion (not shown) protruding the support substrate may be further included at the boundary between the first and second pin parts 551 and 553.

Meanwhile, the terminal region 550a includes locking grooves 556 recessed in a concave shape from both lateral sides thereof.

Although the locking grooves 556 may be formed in dummy regions of edges having no pins 552a, 552b, 554a, 554b, and 554c, the locking grooves 556 may be formed by simultaneously removing portions of the pins 552a, 552b, 554a, 554b, and 554c provided at the edges.

Figure 10:
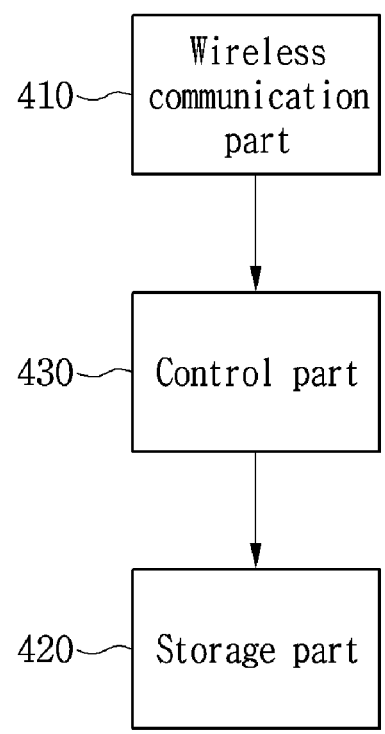
FIG. 10 is a block diagram showing the structure of the lighting control device according to the embodiment of the disclosure.

FIG. 10 is a block diagram showing the structure of the lighting control device 400 according to the embodiment of the disclosure.

Referring to FIG. 10, the lighting control device 400 may be a gateway. The lighting control device 400 registers the tag information by matching the tag information with identification information of a lighting device and controls operating statuses of a plurality of lighting devices using the registered information.

To this end, the lighting control device 400 mainly includes the wireless communication part 410, a storage part 420, and a control part 430.

The wireless communication part 410 makes communication with a management server 700, the lighting switch device 300, and the lighting device 100.

Preferably, the wireless communication part 410 transmits a signal to request coordinate information to the management server 700 to receive the coordinate information transmitted from the management server 700.

In addition, the wireless communication part 410 receives tag information to request registration or tag information to request operation control from the lighting switch device 300. In this case, the wireless communication part 410 may receive identification information of the communication module 120 to be installed in a specific lighting device 100 together with the tag information.

The wireless communication part 410 may receive lighting setting information of a specific lighting device 100 to be matched with the tag information together with the tag information.

The wireless communication part 410 may transmit a control signal to request the change of the operating state to the specific lighting device 100 matched with the tag information.

The storage part 420 stores the identification information of the specific lighting device by matching the identification information with the tag information. In this case, the storage part 420 may store identification information of a communication module to be installed in the specific lighting device by matching the identification information with the tag information.

In addition, the storage part 420 may store lighting setting information for the setting of the operating condition of the lighting device together with the tag information and the identification information of the lighting device or the communication module matched with the tag information.

The control part 430 controls the overall operation of the lighting control device 400.

If the tag information for registration request is received from the lighting switch device 300, the control part 430 matches the specific lighting device 100 with the tag information and registers the tag information.

In this case, if the tag information is received, the control part 430 determines a lighting device having an operating state changed at a time point to receive the tag information among a plurality of lighting devices.

In other words, the control part 430 determines a lighting device blinking at a time point at which the tag information is received, and acquires identification information of the determined lighting device.

Thereafter, the control part 430 matches the tag information with the acquired identification information of the lighting device and registers the tag information.

In addition, after the registration procedure of the tag information has been finished, the result information of the registration procedure is transmitted to the lighting switch device 300.

Meanwhile, alternatively, the control part 430 receives the tag information for the registration request and the identification information of the communication module 120 to be installed in the specific lighting device.

In addition, if the control part 430 receives the tag information and the identification information of the communication module, the identification information of the communication module is registered by matching the identification information with the tag information. In other words, if the communication module is installed in the specific lighting device, the control part 430 matches the lighting device installed in the communication module with the tag information. If the registered tag information is input thereafter, the control part 430 may determine a communication module having the identification information matched with the input tag information, and may transmit the control signal to the determined communication module.

In addition, if the tag information is received, the control part 430 requests the management server to provide coordinate information and receives the coordinate information. Thereafter, the control part 430 determines the position of a user having the tag information and the lighting device installed at the position using the coordinate information. In addition, the control part 430 matches the identification information of the determined lighting device with the received tag information.

Meanwhile, if the lighting setting information is received together with the tag information, the control part 430 stores the lighting setting information in the storage part 420 together with the tag information, and controls the operating state of the lighting device matched with the tag information using the stored lighting setting information.

Meanwhile, if the signal to request the operation control is received, the control part 430 determines the lighting device matched with the tag information based on the registered tag information. In addition, if the lighting device is determined, the control part 430 acquires the operating state information of the determined lighting device and transmits the acquired operating state information to the lighting switch device 300.

In addition, the control part 430 transmits a signal to change the operating state of the determined lighting device to the lighting device (preferably, a communication module installed in the lighting device).

Figure 11:
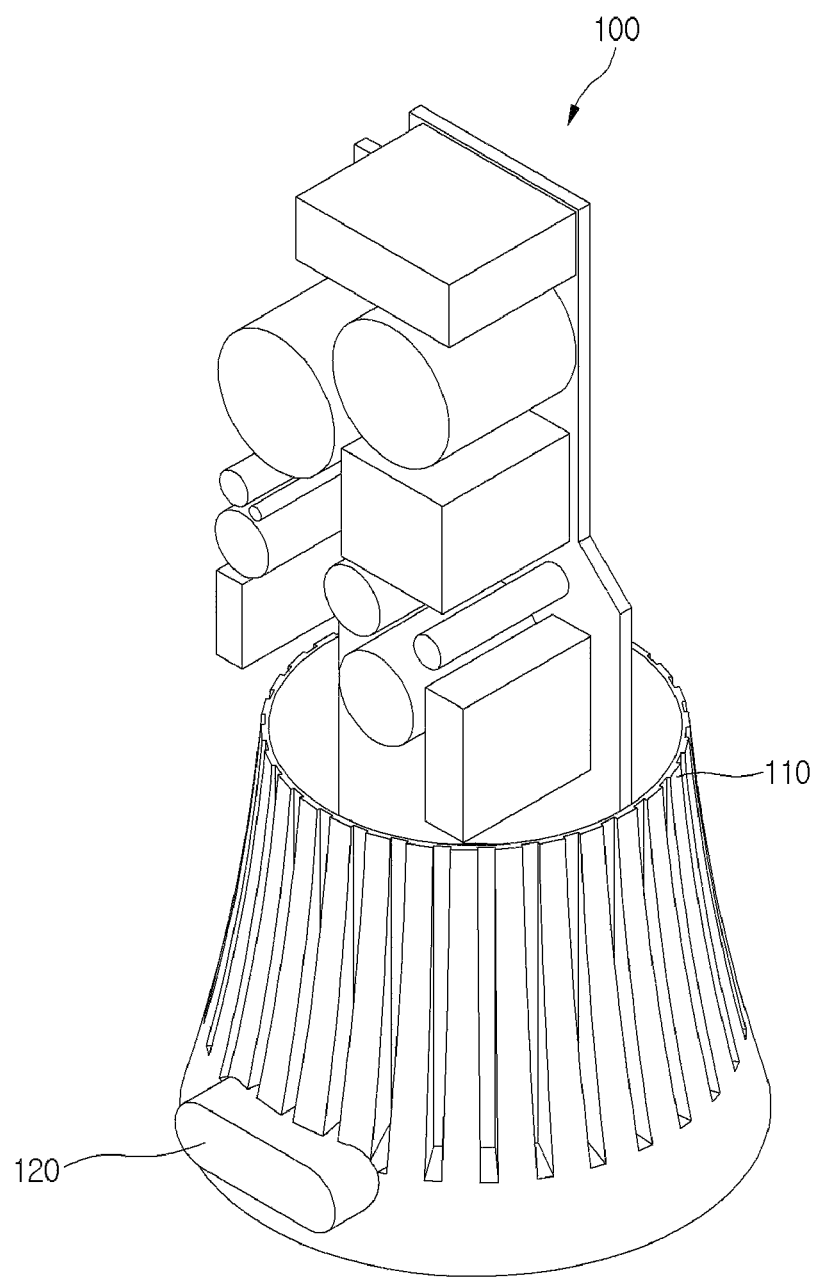
FIG. 11 is a view showing the structure of a lighting device according to one embodiment of the disclosure.

FIG. 11 is a view showing the structure of a lighting device according to one embodiment of the disclosure.

Referring to FIG. 11, the lighting device 100 includes a lighting module 110 and a communication module 120.

The lighting module 110 includes a power supply unit to supply power, a light emitting unit to emit light, and a heat radiation frame to radiate heat.

In addition, the lighting module 110 has a connector (not shown) into which the communication module 120 may be inserted, and the communication module 120 is inserted into the connector.

The communication module 120 receives a control signal transmitted from the lighting control device 400, and transmits the received control signal to the lighting module 110.

The lighting module 110 receives the control signal transmitted through the communication module 120 and control the light emitting unit based on the received control signal.

Since the above-described lighting device 100 having the wireless communication function is well known to those skilled in the art, the details thereof will be omitted. However, different from a lighting device according to the related art, the lighting device 100 according to the disclosure includes the lighting module 110 having the connector, and the communication module 120 may be provided detachably from the connector.

Hereinafter, the registration procedure of the tag information according to the embodiment of the disclosure will be described in more detail.

Figure 12:
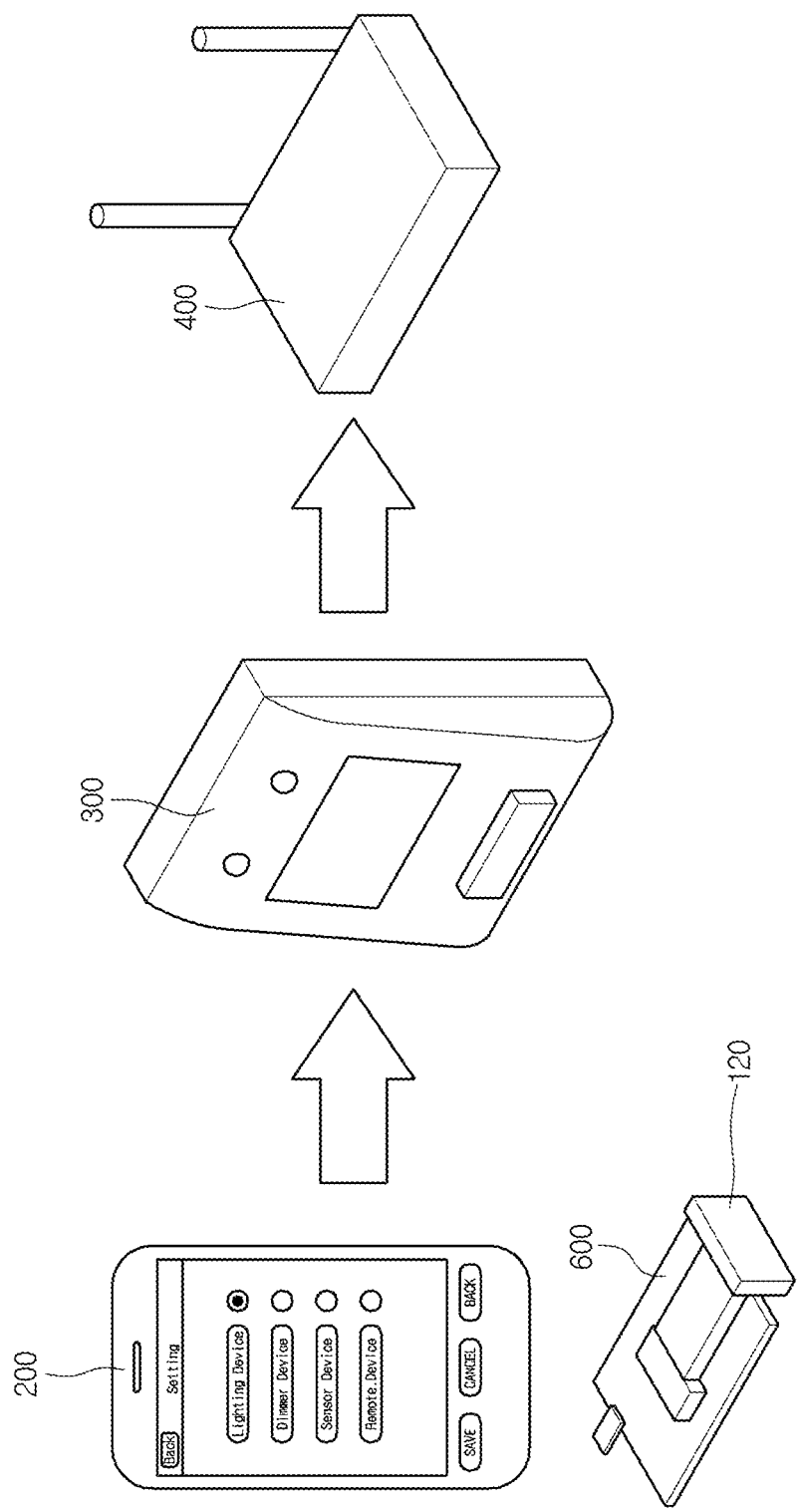
FIGS. 12 to 14 are views showing the registration procedure of the tag information according to the embodiment of the disclosure.
Figure 13:
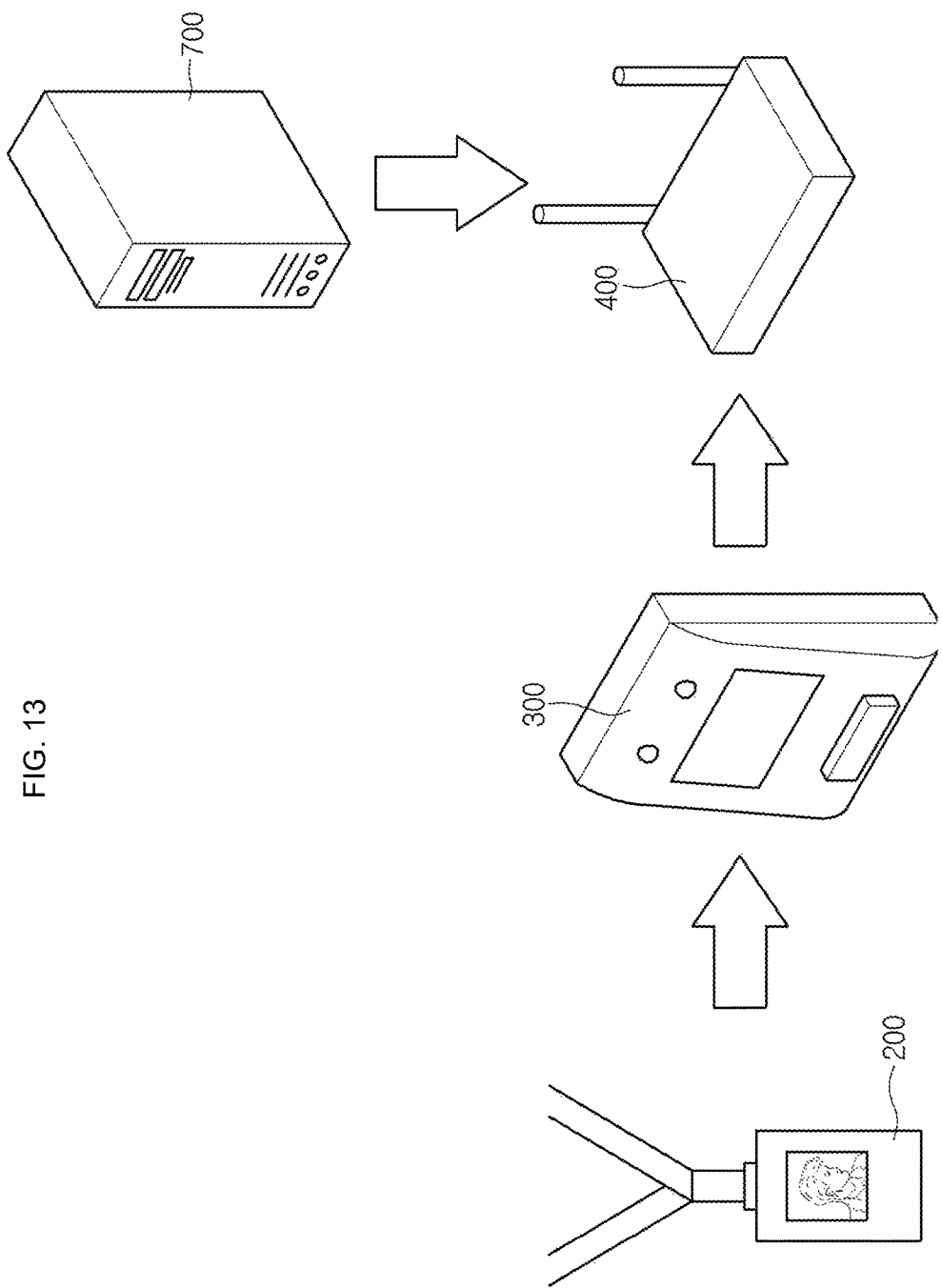
Figure 14:
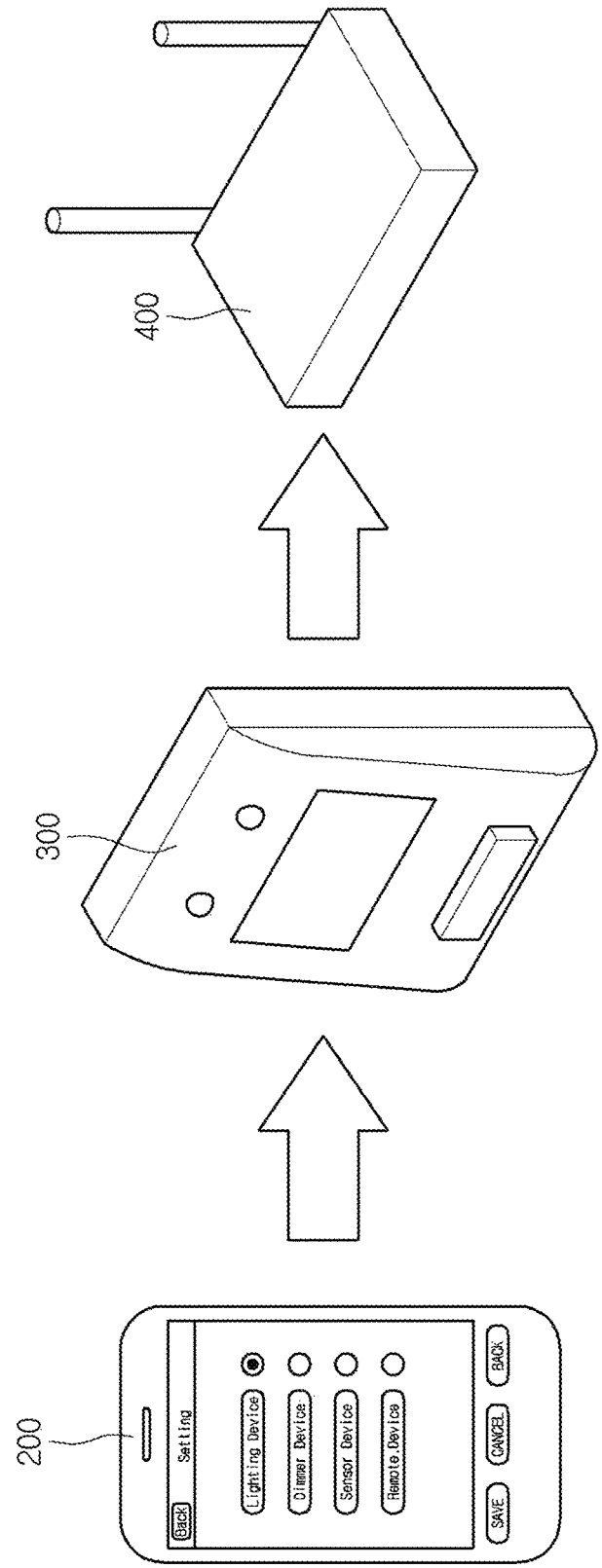

FIGS. 12 to 14 are views showing the registration procedure of the tag information according to the embodiment of the disclosure.

Referring to FIG. 12, according to a first embodiment of the disclosure, tag information and the lighting device 100 are matched with each other and registered using the tag information and a MAC address of the communication module 120 to be installed in the lighting device 100.

According to the first embodiment of the disclosure, the registration procedure of the tag information is performed using a gender board 600.

The gender board 600 is a gender to convert an RF module into a universal serial bus (USB). The gender board 600 has one end having an USB port and an opposite end into which the communication module 120 is inserted.

In addition, the communication module 120 is inserted into the connector of the gender board 600, and the USB port of the gender board 600 into which the communication module 120 is inserted is inserted into the USB port of the tag information transmission device 200.

The tag information transmission device 200 may use a terminal equipped with an NFC tag function.

As described above, in the state that the communication module 120 is inserted into the gender board 600, the gender board 600 is coupled with the tag information transmission device 200. If the tag information transmission device 200 is connected with the lighting switch device 300, the lighting switch device 300 acquires the tag information and the identification information of the communication module 120 from the tag information transmission device 200.

In addition, the lighting switch device 300 transmits the tag information and the identification information of the communication module 120 to the lighting control device 400.

The lighting control device 400 stores the tag information and the identification information of the communication module 120 transmitted from the lighting switch device 300. In addition, the lighting control device 400 matches the identification information of the communication module 120 with the tag information.

In addition, if the communication module 120 having the identification information matched with the tag information is installed in a specific lighting device among a plurality of lighting devices, the lighting control device 400 matches the lighting device having the communication module 120 with the tag information.

If the lighting control device 400 receives the registered tag information thereafter, the lighting control device 400 transmits the control signal to the communication module 120 matched with the tag information. Accordingly, the lighting device 100 having the communication module 120 is controlled by the control signal.

As described above, according to the first embodiment of the disclosure, the identification information of the communication module 120 to be mounted in the lighting device 100 and the tag information are matched with each other by using the gender board 600 to perform the registration procedure of the tag information.

Referring to FIG. 13, according to a second embodiment of the disclosure, the registration procedure of the tag information is performed using the management server 700.

The management server 700 stores coordinate data including tag information of staffs, place arrangement information of the staffs, and the information of lighting devices installed in places of the staffs.

In addition, the tag information transmission device 200 may be an access card provided to each of the staffs.

If the tag information transmission device 200 accesses the lighting switch device 300, the lighting switch device 300 acquires the tag information transmitted from the tag information transmission device 200.

In addition, the lighting switch device 300 transmits the acquired tag information to the lighting control device 400.

The lighting control device 400 compares the tag information transmitted from the lighting switch device 300 with the coordinate data provided from the management server 700 to determine the position of the staff having the tag information and the lighting device 100 installed at the position.

Thereafter, the lighting switch device 300 stores the identification information of the lighting device 100 by matching the identification information with the tag information.

In other words, in the case of the access cards provided for the staffs for the security of a general office environment, the coordinate data of the lighting device, which is a control target of the tag information, are determined using information provided from the management server. The lighting device corresponding to the tag information is determined based on the coordinate data to perform the registration of the tag information.

Meanwhile, according to the disclosure, although only a simple registration procedure of the tag information can be performed as described above, the registration of the tag information and the setting of the operating condition of the lighting device matched with the tag information can be different performed.

Referring to FIG. 14, when the tag information transmission device 200 is a smart phone, an application for lighting control can be performed in the smart phone.

In addition, a user can set the operating condition of the lighting device using the application. The operating condition may include brightness information, color temperature information, on/off schedule information.

In addition, if the tag information transmission device 200 performs the registration of the tag information as described above, the tag information transmission device 200 cannot only provide the tag information, but also can transmit the lighting setting information (information of the operating condition) set through the executed application together.

If the tag information and the lighting setting information are transmitted, the lighting switch device 300 stores the tag information and the lighting setting information. Thereafter, as the tag information is recognized, the stored lighting setting information is applied and a control signal is transmitted to control the operation of the lighting device 100 matched to the lighting setting information.

Figure 15:
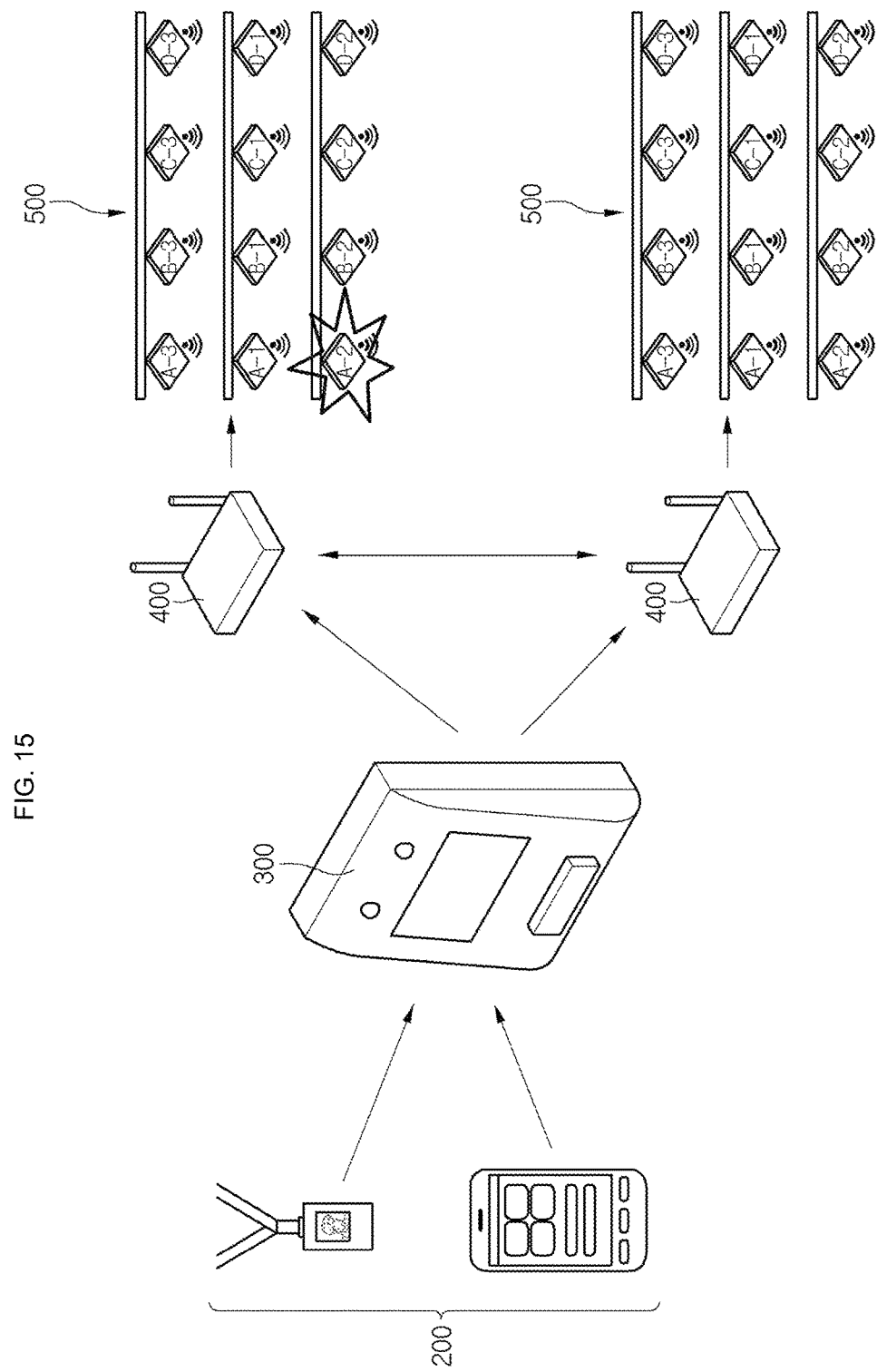
FIGS. 15 and 16 are views showing the control operation of a wireless lighting system according to the embodiment of the disclosure.
Figure 16:
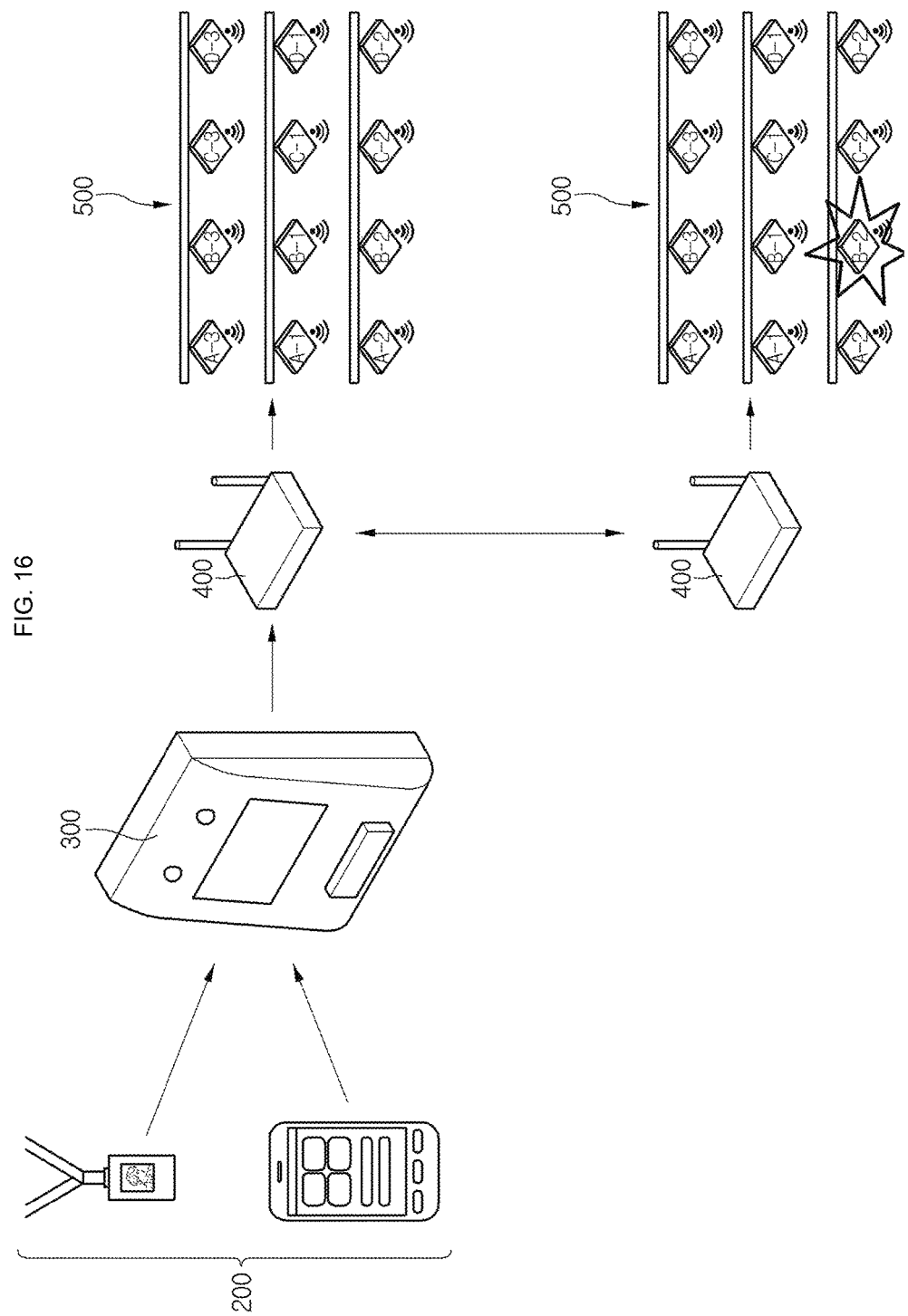

FIGS. 15 and 16 are views showing the control operation of a wireless lighting system according to the embodiment of the disclosure.

Referring to FIG. 15, a plurality of lighting control devices 400 may be formed. One lighting control device 400 may control a plurality of lighting devices 100.

In addition, if the lighting switch device 300 acquires the tag information as the tag information transmission device 200 approaches the lighting switch device 300, the lighting switch device 300 transmits the acquired tag information to the lighting control device 400.

In this case, the lighting switch device 300 transmits the tag information to each of the lighting control devices 400.

Next, the lighting control device 400, which has received the tag information, outputs a control signal to control a lighting device matched with the received tag information if the received tag information is matched with the lighting device controlled by the lighting control device 400.

In other words, if the tag information is tag information matched with the lighting device having identification information of A-2 among lighting devices belonging to a first group, the lighting device having the identification information of A-2 is controlled by a lighting control device to control the lighting devices of the first group.

In addition, referring to FIG. 16, a plurality of lighting control devices 400 may be formed, and one lighting control device 400 may control a plurality of lighting devices 100.

In this case, if the lighting switch device 300 acquires the tag information as the tag information transmission device 200 approaches the lighting switch device 300, the lighting switch device 300 transmits the acquired tag information to the lighting control device 400.

In this case, the lighting switch device 300 transmits the tag information only to one lighting control device 400 among the lighting control devices 400.

Next, the lighting control device 400, which has received the tag information, determines if the received tag information is matched with a lighting device controlled by the lighting control device 400. If the received tag information is matched with the lighting device controlled by the lighting control device 400, the lighting control device 400 outputs a control signal to control the lighting device matched with the received tag information.

However, if the received tag information is not matched with the lighting device controlled by the lighting control device 400, the lighting control device 400 transmits the tag information to another lighting device connected with the lighting control device 400.

Therefore, as shown in FIG. 16, the tag information is transmitted from a lighting control device to control lighting devices of a first group to a lighting control device to control lighting devices of a second group. The lighting control device to control the lighting devices of the second group controls a lighting device having identification information of B-2 among the lighting devices of the second group.

Hereinafter, a registration method and a control method of a wireless lighting system according to the embodiment of the disclosure will be described in detail.

Figure 17:
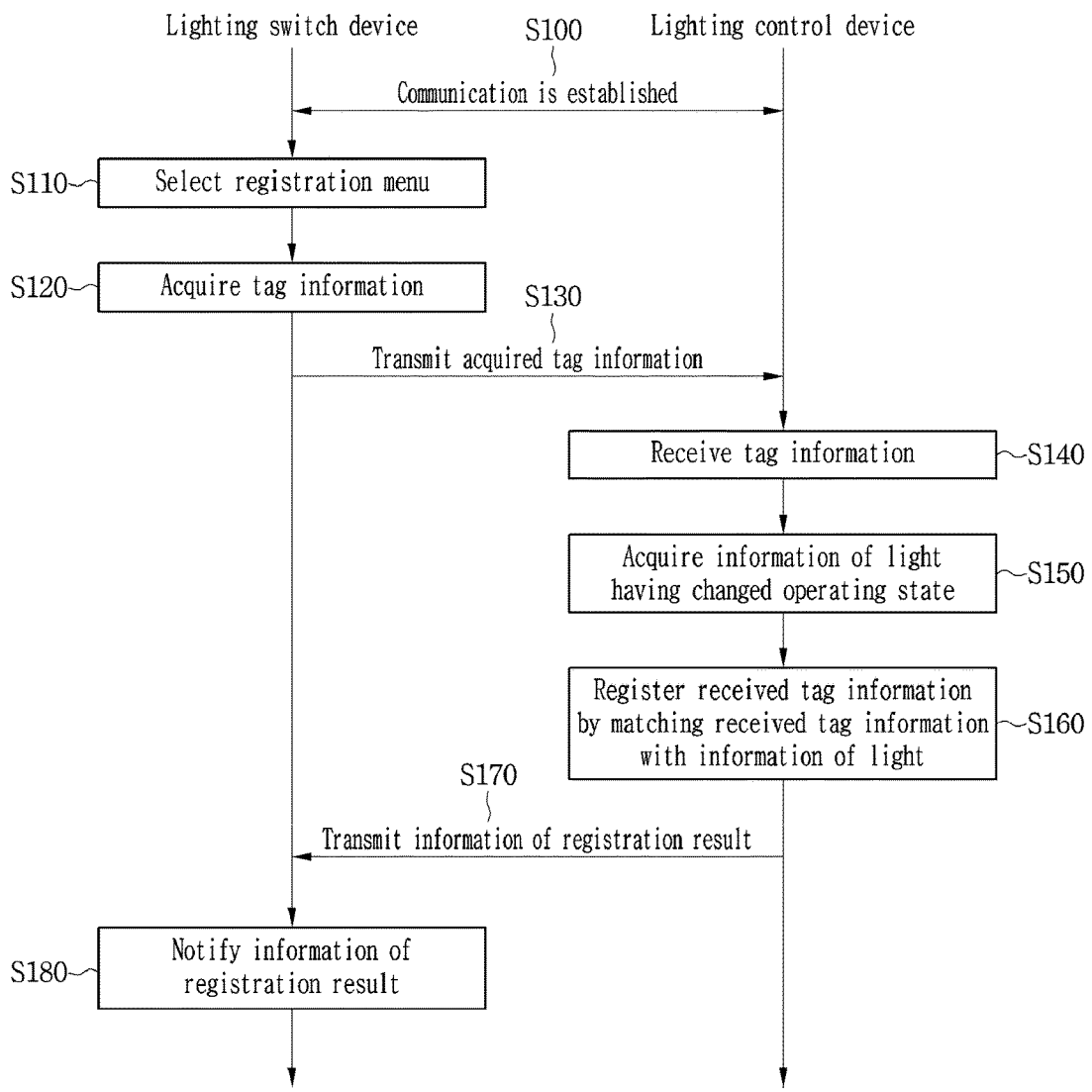
FIG. 17 is a flowchart to explain the registration method of the tag information of the wireless lighting system according to the first embodiment of the disclosure step by step.

FIG. 17 is a flowchart to explain the registration method of the tag information of the wireless lighting system according to the first embodiment of the disclosure step by step.

First, communication between the lighting switch device 300 and the lighting control device 400 is established (step S100).

Thereafter, a registration menu is selected by pressing the registration button provided in the lighting switch device 300 (step S110).

In addition, the lighting switch device 300 acquires the tag information transmitted from the tag information transmission device 200 (step S120).

If the lighting switch device 300 acquires the tag information, the lighting switch device 300 transmits the acquired tag information and the information to request the registration of the tag information to the lighting control device 400 (step S130).

The lighting control device 400 receives the tag information (step S140).

Then, if the tag information is received, the lighting control device 400 determines a lighting device having an operating state changed at a time point at which the tag information is received among a plurality of lighting devices (step S150). In other words, the lighting control device 400 determines the lighting device, which blinks, and acquires the identification information of the lighting device.

Thereafter, the lighting control device 400 registers the acquired tag information by matching the tag information with the acquired identification information of the lighting device (step S160).

If the registration procedure of the tag information has been finished, the lighting control device 400 transmits result information of the registration procedure to the lighting switch device 300 (step S170).

Thereafter, the lighting switch device 300 receives and outputs the transmitted result information (step S180).

Figure 18:
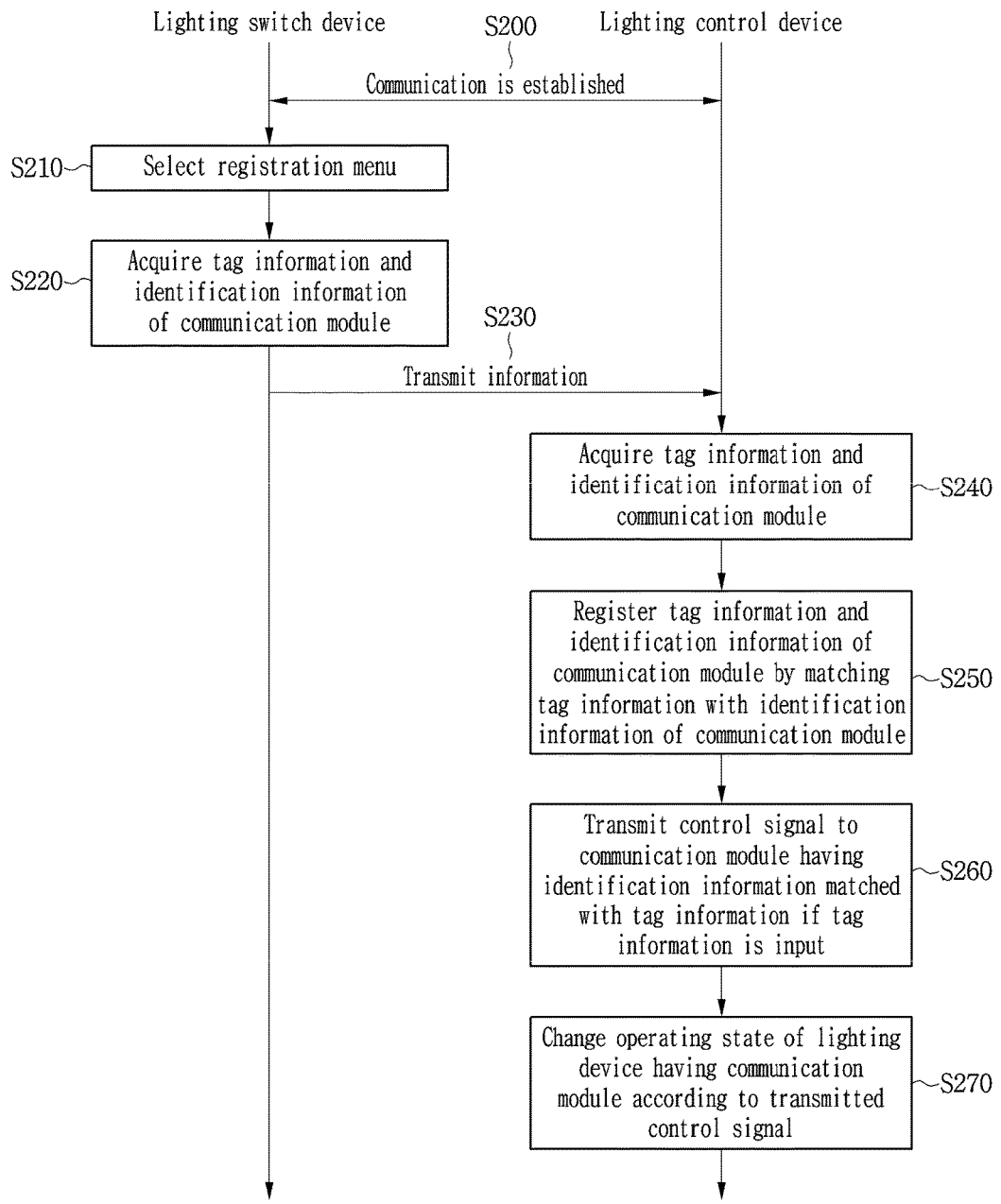
FIG. 18 is a flowchart to explain the registration method of the tag information of the wireless lighting system according to the second embodiment of the disclosure step by step.

FIG. 18 is a flowchart to explain a registration method of tag information of a wireless lighting system according to the second embodiment of the disclosure step by step.

First, communication between the lighting switch device 300 and the lighting control device 400 is made (step S200).

Thereafter, a registration menu is selected by pressing the registration button provided in the lighting switch device 300 (step S210).

In addition, the lighting switch device 300 acquires the tag information and identification information of a communication module 120 installed in the tag information transmission device 200, which are transmitted from the tag information transmission device 200 (step S220).

If the tag information and the identification information of the communication module are acquired, the lighting switch device 300 transmits information to request the registration of the tag information together with the acquired tag information and the identification information of the communication module 120 to the lighting control device 400 (step S230).

The lighting control device 400 receives the tag information and the identification information of the communication module 120 (step S240).

If the tag information and the identification information are received, the lighting control device 400 registers the tag information and the identification information of the communication module by matching the tag information with the identification information of the communication module (step S250). In other words, if the communication module is installed in the specific lighting device, the lighting control device 400 matches the lighting device having the communication module with the tag information.

Accordingly, if the registered tag information is input thereafter, the lighting control device 400 determines the communication module having the identification information matched with the input tag information and transmits a control signal to the determined communication module (step S260).

In addition, the lighting device having the communication module receives the transmitted control signal, and changes the operating state thereof by the received control signal (step S270).

Figure 19:
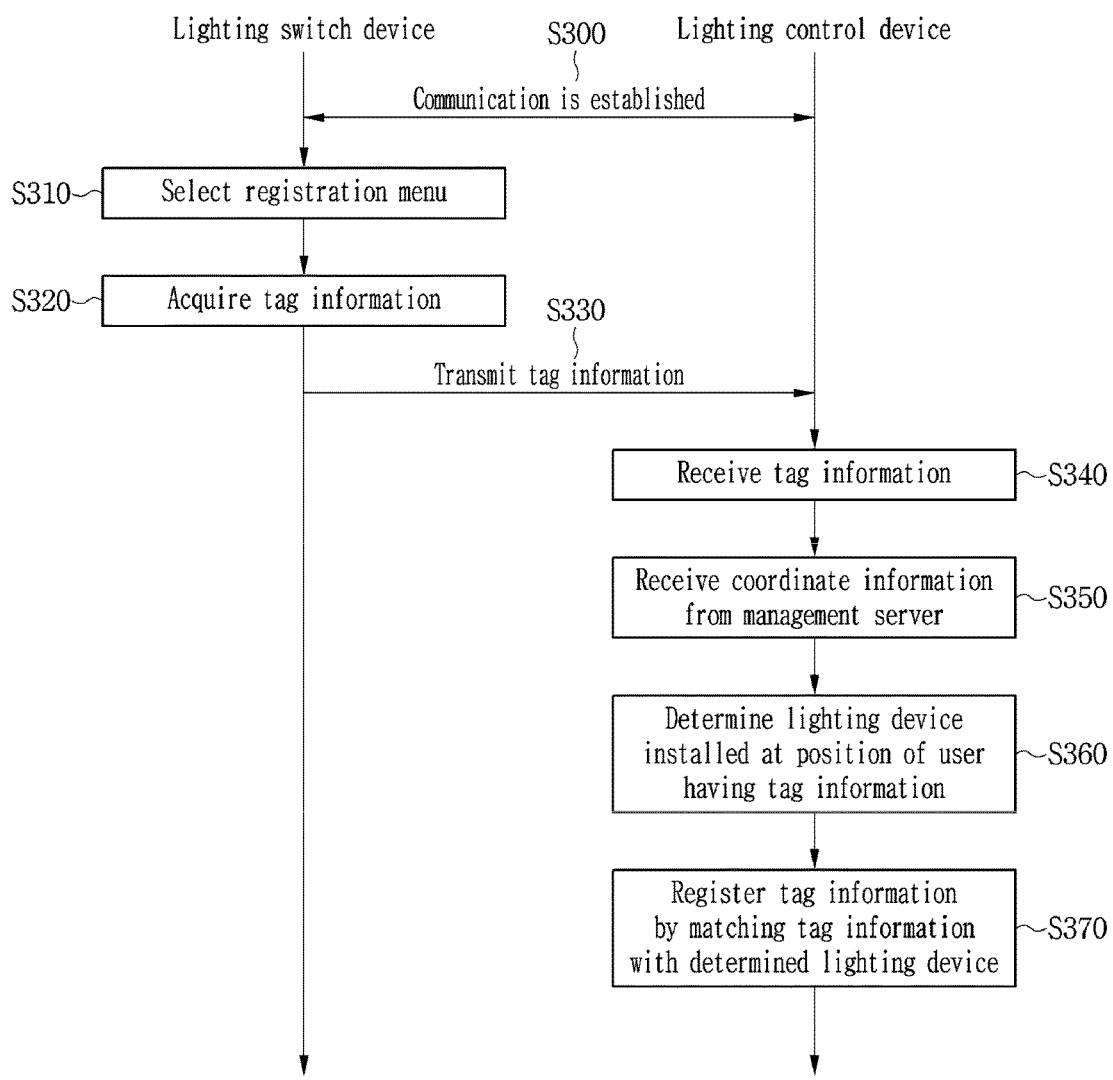
FIG. 19 is a flowchart to explain the registration method of the tag information of the wireless lighting system according to the third embodiment of the disclosure step by step.

FIG. 19 is a flowchart to explain a registration method of tag information of a wireless lighting system according to the third embodiment of the disclosure step by step.

First, communication between the lighting switch device 300 and the lighting control device 400 is made (step S200).

Thereafter, a registration menu is selected by pressing the registration button provided in the lighting switch device 300 (step S310).

In addition, the lighting switch device 300 acquires the tag information transmitted from the tag information transmission device 200 (step S320).

If the tag information is acquired, the lighting switch device 300 transmits the acquired tag information and the information to request the registration of the tag information to the lighting control device 400 (step S330).

The lighting control device 400 receives the tag information (step S340).

Next, if the tag information is received, the lighting control device 400 receives coordinate information from the management server (step S350).

Thereafter, the lighting control device 400 determines the position of a user having the tag information and a lighting device installed at the position using the coordinate information (step S360).

Next, the lighting control device 400 matches the identification information of the determined lighting device with the received tag information (step S370).

Figure 20:
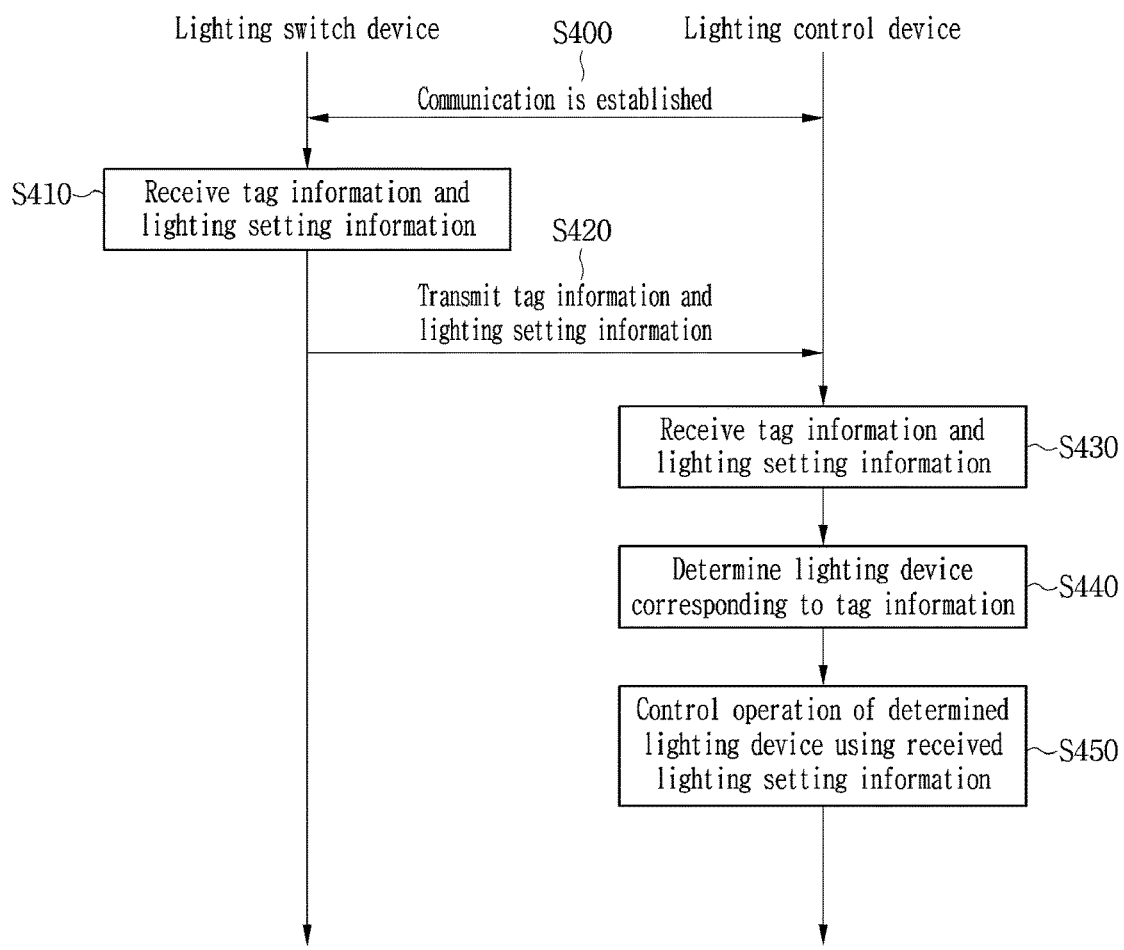
FIG. 20 is a flowchart to explain the registration method of tag information of a wireless lighting system according to the fourth embodiment of the disclosure step by step.

FIG. 20 is a flowchart to explain the registration method of tag information of a wireless lighting system according to the fourth embodiment of the disclosure step by step.

First, communication between the lighting switch device 300 and the lighting control device 400 is made (step S400).

Thereafter, the lighting switch device 300 receives the tag information transmitted from the tag information transmission device 200 and lighting setting information set through the execution of an application (step S410).

If the tag information and the lighting setting information are received, the lighting switch device 300 transmits the tag information and the lighting setting information to the lighting control device 400 (step S420).

The lighting control device 400 receives the tag information and the lighting setting information transmitted through the lighting switch device 300 (step S430).

In addition, the lighting control device 400 determines a lighting device matched with the received tag information (step S440) and sets the operating condition of the determined lighting device using the lighting setting information (step S450).

Figure 21:
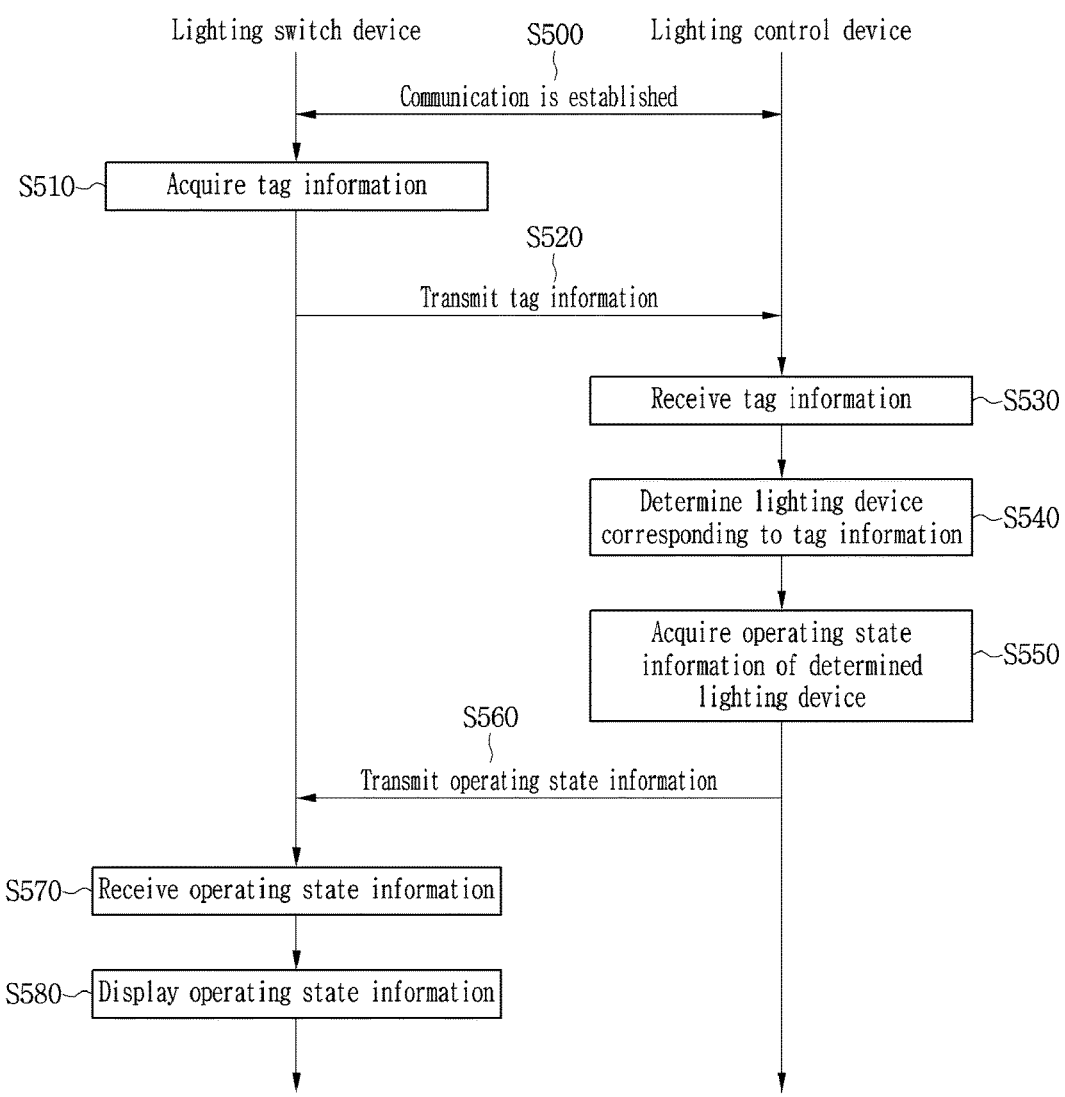
FIG. 21 is a flowchart to explain a method of controlling a wireless lighting system according to the embodiment of the disclosure.

FIG. 21 is a flowchart to explain a method of controlling a wireless lighting system according to the embodiment of the disclosure.

Referring to FIG. 21, communication between the lighting switch device 300 and the lighting control device 400 is made (step S500).

Next, the lighting switch device 300 receives tag information transmitted from the tag information transmission device 200 (step S510).

If the tag information is received, the lighting switch device 300 transmits the tag information to the tag information (step S520).

The lighting control device 400 receives the tag information transmitted through the lighting switch device 300 (step S530), and determines a lighting device matched with the tag information (step S540).

Thereafter, if the lighting device is determined, the operating state information of the determined lighting device is acquired (step S550), and the acquired operating state information is transmitted to the lighting switch device 300 (step S560).

The lighting switch device 300 receives the operating state information (step S570), and outputs the received operating state information (step S580).

Accordingly, a user determines the state of a lighting device installed at a position of the user as the lighting switch device 300 only recognizes the tag information. The user can easily control the state of the lighting device to a state required by the user based on the determined state of the lighting device.

Figure 22:
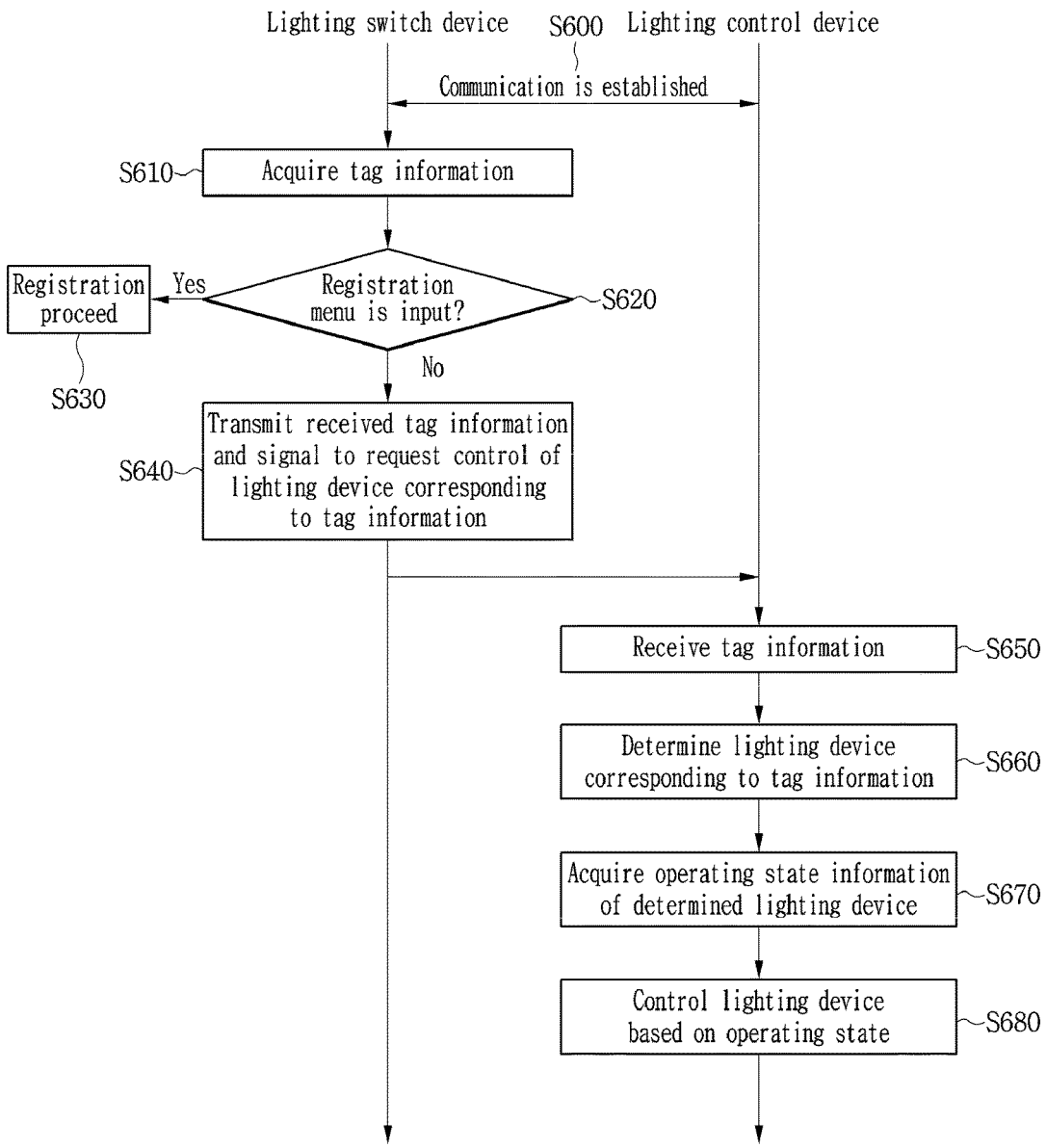
FIG. 22 is a flowchart to explain a method of controlling the wireless lighting system according to one embodiment of the disclosure.

FIG. 22 is a flowchart to explain a method of controlling a wireless lighting system according to one embodiment of the disclosure.

Referring to FIG. 22, communication between the lighting switch device 300 and the lighting control device 400 is made (step S600).

Next, the lighting switch device 300 receives tag information transmitted from the tag information transmission device 200 (step S610).

If the tag information is received, the lighting switch device 300 determines if the tag information is received in the state that a registration menu is input (step S620).

In addition, if the tag information is received in the state that the registration menu is input, the lighting switch device 300 performs a registration procedure of the input tag information (step S630).

If the tag information is received in the state that the registration menu is not input, the lighting switch device 300 transmits the received tag information and a signal to request the control of the lighting device corresponding to the tag information (step S640).

The lighting control device 400 receives the tag information transmitted through the lighting switch device 300 (step S650).

In addition, the lighting control device 400 determines a lighting device corresponding to (matched with) the received tag information (step S660).

Thereafter, if the lighting device is determined, the lighting control device 400 determines the present operating state of the determined lighting device (step S670). In other words, the lighting control device 400 determines whether the lighting device is in an on state or an off status.

In addition, the lighting control device 400 outputs a control signal to control the operation of the lighting device based on the determined operating state (step S680).

Figure 23:
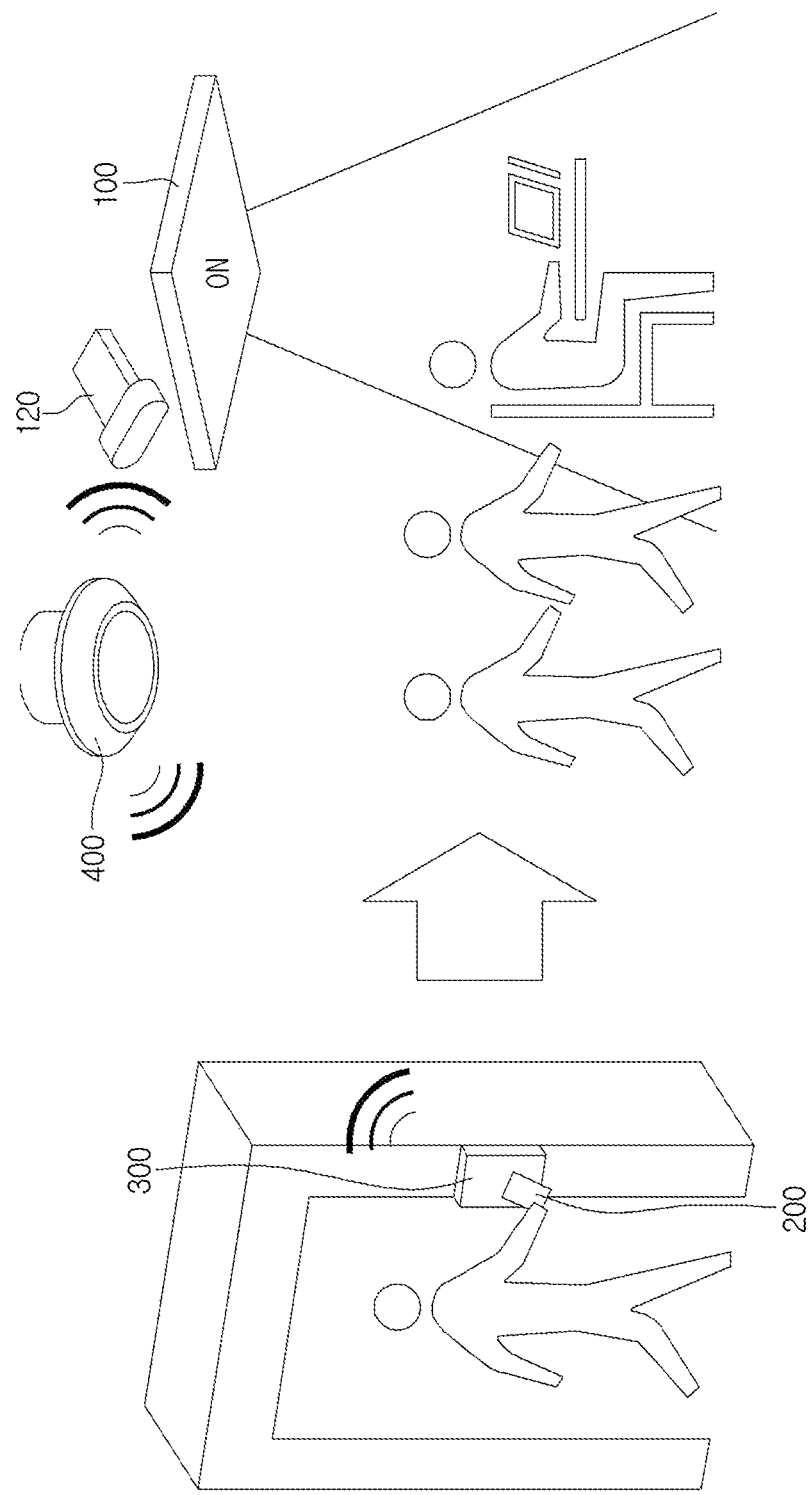
FIGS. 23 and 24 are views showing an operation control state of a lighting device according to the embodiment of the disclosure.
Figure 24:
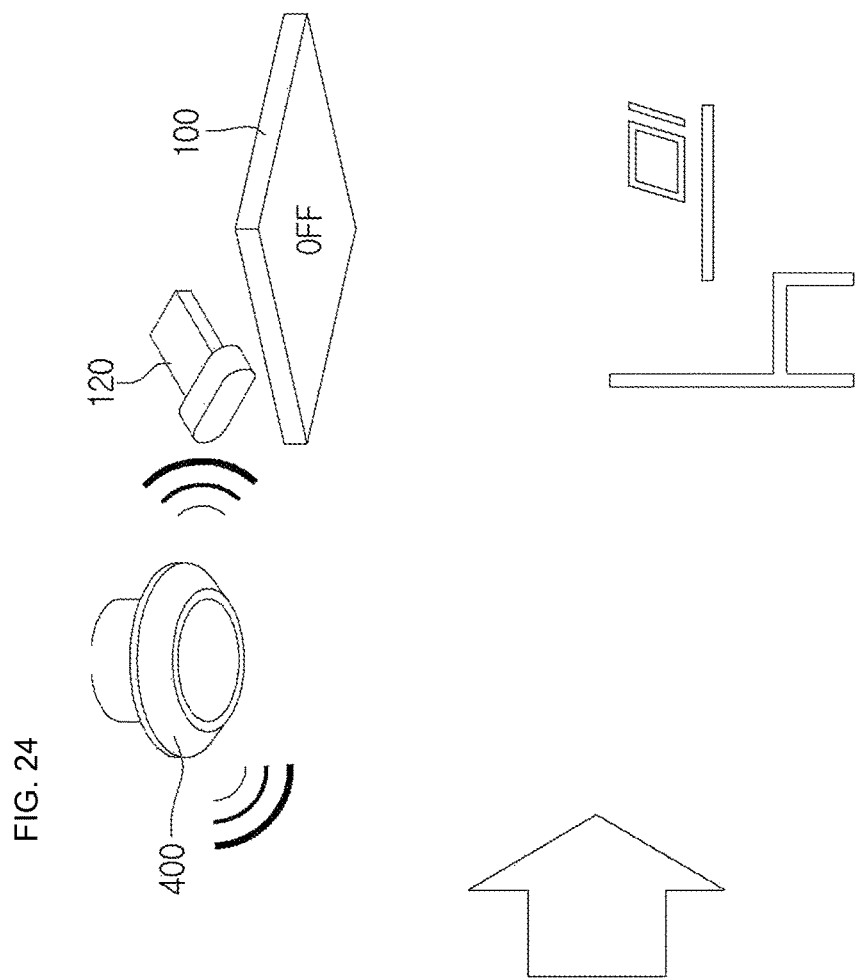

FIGS. 23 and 24 are views showing an operation control state of a lighting device according to the embodiment of the disclosure.

Referring to FIG. 23, if the operating state of the lighting device is in the off state at a time point at which the tag information is received, the lighting control device 400 outputs a control signal to change the operating state of the lighting device into the on status.

In other words, the above case corresponds to a situation in which a user allows the lighting switch device 300, which is installed at an entrance of a building, to recognize tag information to enter an inner part of the building, to return to the position of the user and to perform a job of the user.

Referring to FIG. 24, if the operating state of the lighting device is in the on state at the time point at which the tag information is received, the lighting control device 400 outputs a control signal to change the operating state of the lighting device into the off status.

That is to say, in the above case, the user allows the lighting switch device 300, which installed at the entrance of the building, to recognize the tag information in order to go out of the building.

According to the embodiment of the disclosure, the identification information of the lighting device is matched with the tag information and stored, and the lighting device is automatically controlled using the above information, so that the inconvenience of selecting one of a plurality of lighting devices can be resolved.

In addition, according to the embodiment of the disclosure, the limitation, such as complexity, in the individual control of the lighting device using a smart phone according to the related art can be overcome. When a user enters or go out of a chamber, automatic lighting control can be performed, so that energy can be saved.

The embodiment provides a wireless lighting control apparatus, capable of easily controlling one of a plurality of lighting devices using tag information as the tag information is matched with identification information of lights and registered, a wireless lighting system, and a method of controlling the same.

Meanwhile, the technical objects accomplished by the embodiments may not be limited to the above object, and other technical objects of the embodiment will be clearly understood by those skilled in the art from the following description.

According to the embodiment, there is provided a lighting control apparatus including a wireless communication part to receive tag information transmitted from a lighting switch device, a control part to register the received tag information by matching the received tag information with at least one of a plurality of lighting devices, and to control the lighting devices using the registered tag information, and a storage part to store the tag information and identification information of the lighting device matched with the tag information.

In addition, the control part determines a lighting device having an operating state changed at a time point at which the tag information is received if the tag information is received, and registers the received tag information by matching the received tag information with the determined lighting device.

In addition, the control part receives coordinate information from a management server if the tag information is received, determines a position of a user assigned with the tag information and at least one lighting device installed at the position of the user by using the coordinate information, and registers the received tag information by matching the tag information with the determined at least one lighting device.

Further, the control part receives the tag information and identification information of a communication module to be mounted in one specific lighting device among the lighting devices from the lighting switch device, registers the received tag information by matching the received tag information with the identification information of the communication module, and matches the specific lighting device having the communication module mounted therein with the tag information if the communication module is mounted in the specific lighting device.

Further, the control part receives the tag information and lighting setting information for setting of an operating state of the lighting device to be matched with the tag information, and sets the operating state of the lighting device matched with the tag information using the received lighting setting information.

In addition, the control part transmits information of a registration result of the tag information to the lighting switch device if registration of the tag information is completed.

In addition, the control part determines a lighting device matched with tag information, which is previously registered, if the tag information, which is previously registered, is received and transmits a control signal to request change of an operating state to the determined lighting device.

In addition, the control part determines a present operating state of a lighting device matched with tag information, which is previously registered if the tag information, which is previously registered, is received and transmits information of the present operating state to the lighting switch device.

Meanwhile, according to the embodiment, there is provided a wireless lighting system including a lighting switch device to recognize approach of a tag device, to acquire tag information from the approaching tag device, and to transmit the tag information, and a lighting control device to receive the tag information transmitted from the lighting switch device and to register the received tag information by matching the received tag information with at least one of a plurality of lighting devices. The lighting control device determines a lighting device matched with tag information, which is previously registered, if the tag information, which is previously registered, is received from the lighting switch device, and changes an operating state of the determined lighting device.

In addition, the lighting switch device includes a first communication module to transmit the acquired tag information to the lighting control device through a wireless network, and a reader unit including a connector into which the first communication module is inserted and a registration button for registration of the tag information, acquiring the tag information from the tag device, and transmitting the tag information acquired through the connector to the first communication module. The first communication module transmits a signal to request the registration of the tag information to the lighting control device together with the tag information if the tag information is acquired in a state that the registration button is pressed.

In addition, the tag information is registered as the tag information is matched with at least one of a first lighting device having an operating state changed at a time point at which the tag information is received, a second lighting device installed at a position of a user assigned with the tag information, and a third lighting device having a second communication module to receive the tag information.

In addition, the lighting control device transmits information of a registration result of the tag information to the lighting switch device if registration of the tag information is completed, and the lighting switch device displays the information of the registration result of the received tag information.

Further, the lighting switch device transmits the tag information and a control signal to request change of an operating state to the determined lighting device matched with the tag information to the lighting control device if the tag information is received in a state that the registration button is not pressed.

Further, the lighting control device determines a present operating state of the lighting device matched with the tag information if the signal to request the change of the operating state is received, and transmits information of the determined present operating state to the lighting switch device, and the lighting switch device displays the information of the present operating state of the lighting device corresponding to the tag information.

Meanwhile, according to the embodiment, there is provided a method of controlling a wireless lighting system. The method includes transmitting tag information acquired from a tag device through a lighting switch device, determining at least one lighting device to be matched with the tag information among a plurality of lighting devices, registering the tag information by matching the tag information with the determined lighting device, and changing an operating state of the lighting device matched with the tag information if the registered tag information is received.

In addition, the determining of the at least one lighting device includes determining a lighting device having an operating state changed at a time point at which the tag information is received, and determining the determined lighting device as the at least one lighting device to be matched with the tag information.

In addition, the determining of the at least one lighting device includes receiving coordinate information from a management server if the tag information is received, determining a position of a user assigned with the tag information and at least one lighting device installed at the position using the received coordinate information, and determining the determined at least one lighting device as the at least one lighting device to be matched with the tag information.

The method further includes receiving the tag information and identification information of a communication module to be mounted in one specific lighting device among the lighting devices from the lighting switch device. The determining of the at least one lighting device includes determining a lighting device having the communication module mounted therein, and determining the determined lighting device as the at least one lighting device to be matched with the tag information.

The method further includes transmitting information of a registration result of the tag information to the lighting switch device if registration of the tag information is completed.

In addition, the method further includes determining a present operating state of a lighting device matched with tag information, which is previously registered, if the tag information, which is previously registered, is received and transmits information of the determined present operating state to the lighting switch device.

As described above, according to the embodiment of the disclosure, the identification information of the lighting device is matched with the tag information and stored, and the lighting device can be automatically controlled using the above information, so that the inconvenience of selecting one of a plurality of lighting devices can be resolved.

In addition, according to the embodiment of the disclosure, the limitation, such as complexity, in the individual control of the lighting device using a smart phone according to the related art can be overcome. When a user enters or go out of a chamber, automatic lighting control can be performed, so that energy can be saved.

Terminologies used in this specification are selected from general terminologies by taking the functions thereof into consideration and they may vary depending on the intentions of operators having ordinary skill in the art, customers and appearance of new technologies. In certain instances, the terminologies may be arbitrarily selected by applicant, and the meaning of the terminologies may be described in corresponding parts of the specification. The terminologies used in this specification may be defined based on the substantial meanings thereof and the whole context throughout the present specification.

The combinations of each block and each step of flowcharts in accompanying drawings may be executed by computer program instructions. Since the computer program instructions are provided in processors of a general computer, a special computer, and other programmable data processing devices, the instructions executed through the computer or the other programmable data processing devices create units to perform functions described in each block or each step of the flowcharts in the drawings. Since the computer program instructions may be stored in a computer usable memory or a computer readable memory to support the computer or the other programmable data processing devices in order to implement the functions through a specific scheme, the computer program instructions stored in a computer usable memory or a computer readable memory can create manufacturing items including the instruction units to perform functions described in each block or each step of the flowcharts in the drawings. Since computer program instructions can be provided on the computer, and other programmable data processing devices, a series of operation steps are executed on the computer, and other programmable data processing devices to create processes executed by the computers, so that the instructions to run the computer, and other programmable data processing devices can provide steps to perform the functions in each block and each step of the flowcharts in the drawings.

In addition, each block or each step may represent a portion of a module, a segment, or a code including at least one executable instruction to perform specific logical function (functions). The described functions in blocks or steps may be provided regardless of a sequence in several alternative embodiments. For example, two blocks or two steps, which are consecutively shown, may be substantially simultaneously performed or may be reversely performed according to relevant functions from time to time.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting control apparatus comprising:
a wireless communication module configured to receive tag information transmitted from a lighting switch device;
a control module configured to register the received tag information by matching the received tag information with at least one of a plurality of lighting devices, and to control the lighting devices based on the registered tag information; and
a storage module configured to store the tag information and identification information of the lighting device matched with the tag information,
wherein the control module is configured to select a lighting device to be matched with the received tag information among the plurality of lighting devices when the received tag information is registered, and register the received tag information to store an identifier for the selected lighting device with the received tag information,
wherein the control module receives the tag information and identification information of a communication module to be mounted in one specific lighting device among the lighting devices from the lighting switch device, registers the received tag information by matching the received tag information with the identification information of the communication module, and matches the specific lighting device having the communication module mounted therein with the tag information when the communication module is mounted in the specific lighting device, and
wherein the selected lighting device is the lighting device to be mounted the communication module.

2. The lighting control apparatus of claim 1, wherein the control module determines a lighting device having an operating state changed at a time point at which the tag information is received when the tag information is received, and registers the received tag information by matching the received tag information with the determined lighting device, and
wherein the selected lighting device is the lighting device having the operating state changed at the time point.

3. The lighting control apparatus of claim 1, wherein the control module receives coordinate information from a management server when the tag information is received, determines a position of a user assigned with the tag information and at least one lighting device installed at the position of the user based on the coordinate information, and registers the received tag information by matching the tag information with the determined at least one lighting device, and
wherein the selected lighting device is the determined lighting device.

4. The lighting control apparatus of claim 1, wherein the control module receives the tag information and lighting setting information for setting of an operating state of the lighting device to be matched with the tag information, and sets the operating state of the lighting device matched with the tag information based on the received lighting setting information.

5. The lighting control apparatus of claim 1, wherein the control module transmits information of a registration result of the tag information to the lighting switch device when registration of the tag information is completed.

6. The lighting control apparatus of claim 1, wherein the control module determines a lighting device matched with tag information, which is previously registered, when the tag information, which is previously registered, is received and transmits a control signal to request change of an operating state to the determined lighting device.

7. The lighting control apparatus of claim 1, wherein the control module determines a present operating state of a lighting device matched with tag information, which is previously registered when the tag information, which is previously registered, is received and transmits information of the present operating state to the lighting switch device.

8. A wireless lighting system comprising:
a light switch configured to recognize approach of a tag device, to acquire tag information from the approaching tag device, and configured to transmit the tag information; and
a lighting control module configured to receive the tag information transmitted from the light switch and to register the received tag information by matching the received tag information with at least one of a plurality of lighting devices,
wherein the lighting control module determines a lighting device matched with tag information, which is previously registered, when the tag information, which is previously registered, is received from the light switch, and changes an operating state of the determined lighting device,
wherein the light switch comprises:
a first communication module to transmit the acquired tag information to the lighting control module through a wireless network; and
a reader unit comprising a connector into which the first communication module is inserted and a registration button for registration of the tag information, acquiring the tag information from the tag device, and transmitting the tag information acquired through the connector to the first communication module, and
wherein the first communication module transmits a signal to request the registration of the tag information to the lighting control module together with the tag information when the tag information is acquired in a state that the registration button is pressed,
wherein the lighting control module selects a lighting device to be matched with the received tag information among the plurality of lighting devices when the registration request signal is received, and registers the received tag information to store the selected lighting device with the received tag information,
wherein the lighting control module receives the tag information and identification information of a second communication module to be mounted in one specific lighting device among the lighting devices from the light switch, registers the received tag information by matching the received tag information with the identification information of the second communication module, and matches the specific lighting device having the second communication module mounted therein with the tag information when the second communication module is mounted in the specific lighting device, and
wherein the selected lighting device is the lighting device to be mounted the second communication module.

9. The wireless lighting system of claim 8, wherein the lighting control module transmits information of a registration result of the tag information to the light switch when registration of the tag information is completed, and
    wherein the light switch displays the information of the registration result of the received tag information.

10. The wireless lighting system of claim 8, wherein the light switch transmits the tag information and a control signal to request change of an operating state to the determined lighting device matched with the tag information to the lighting control module when the tag information is received in a state that the registration button is not pressed.

11. The wireless lighting system of claim 10, wherein the lighting control module determines a present operating state of the lighting device matched with the tag information when the signal to request the change of the operating state is received, and transmits information of the determined present operating state to the light switch, and
    wherein the light switch displays the information of the present operating state of the lighting device corresponding to the tag information.

12. A method of controlling a wireless lighting system, the method comprising:
    transmitting tag information acquired from a tag device through a light switch;
    receiving the tag information and identification information of a communication module to be mounted in one specific lighting device among a plurality of lighting devices from the light switch,
    determining at least one lighting device to be matched with the tag information among the plurality of lighting devices;
    registering the tag information by matching the tag information with the determined lighting device; and
    changing an operating state of the lighting device matched with the tag information when the registered tag information is received,
    wherein the determining of the lighting device comprises selecting a lighting device to be matched with the received tag information among the plurality of lighting devices when the received tag information is registered,
    wherein the determining of the at least one lighting device comprises:
        determining a lighting device having the communication module mounted therein when the tag information and identification information of the communication module are received, and
        determining the determined lighting device as the at least one lighting device to be matched with the tag information.

13. The method of claim 12, wherein the selecting of the lighting device comprises:
    determining a lighting device having an operating state changed at a time point at which the tag information is received; and
    determining the determined lighting device as the at least one lighting device to be matched with the tag information.

14. The method of claim 12, wherein the selecting of the lighting device comprises:
    receiving coordinate information from a management server when the tag information is received;
    determining a position of a user assigned with the tag information and at least one lighting device installed at the position based on the received coordinate information; and
    determining the determined at least one lighting device as the at least one lighting device to be matched with the tag information.

15. The method of claim 12, further comprising transmitting information of a registration result of the tag information to the light switch when registration of the tag information is completed.

16. The method of claim 12, further comprising determining a present operating state of a lighting device matched with tag information, which is previously registered, when the tag information, which is previously registered, is received and transmits information of the determined present operating state to the light switch.

* * * * *